(12) United States Patent
Walters et al.

(10) Patent No.: US 6,453,281 B1
(45) Date of Patent: *Sep. 17, 2002

(54) PORTABLE AUDIO DATABASE DEVICE WITH ICON-BASED GRAPHICAL USER-INTERFACE

(75) Inventors: Timothy L. Walters, San Diego; Anil K. Agarwal, Poway, both of CA (US); Thomas Russell, Murray Hill, NJ (US)

(73) Assignee: VXI Corporation, Rollinsford, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 64 days.

(21) Appl. No.: 08/688,299

(22) Filed: Jul. 30, 1996

(51) Int. Cl.[7] .................................................. G06F 3/00
(52) U.S. Cl. ........................................ 704/200; 704/270
(58) Field of Search ................................ 704/200, 235, 704/251, 278, 270; 345/864, 169, 184

(56) References Cited

U.S. PATENT DOCUMENTS

| | | |
|---|---|---|
| 4,144,582 A | 3/1979 | Hyatt |
| 4,588,857 A | 5/1986 | Arsem |
| 4,644,107 A | 2/1987 | Clowes et al. |
| 4,677,569 A | 6/1987 | Nakano et al. |
| 4,717,261 A | 1/1988 | Kita et al. |
| 4,837,808 A | 6/1989 | Immendorfer et al. |
| 4,882,685 A | 11/1989 | van der Lely |
| 4,922,538 A | 5/1990 | Tchorzewski |
| 5,020,107 A | 5/1991 | Rohani et al. |
| 5,222,121 A | 6/1993 | Shimada |
| 5,265,191 A | 11/1993 | McNair |
| 5,325,421 A | 6/1994 | Hou et al. |
| 5,335,276 A | 8/1994 | Thompson et al. |
| 5,359,698 A | 10/1994 | Goldberg et al. |
| 5,430,827 A | 7/1995 | Rissanen |
| 5,450,525 A | 9/1995 | Russell et al. |
| 5,475,798 A * | 12/1995 | Handlos .................... 704/277 |
| 5,481,645 A * | 1/1996 | Bertino et al. ............... 704/270 |
| 5,491,774 A | 2/1996 | Norris et al. |
| 5,499,316 A | 3/1996 | Sudoh et al. |
| 5,526,411 A * | 6/1996 | Krieter .................. 379/110.01 |
| 5,696,496 A | 12/1997 | Kumar |
| 5,742,736 A * | 4/1998 | Haddock .................... 704/270 |
| 5,812,870 A * | 9/1998 | Kikinis et al. .......... 395/800.32 |

OTHER PUBLICATIONS

Microsoft, Microsoft Windows User's Guide, pp. 5–47, 91–138,425, 1992.*
MediaVision, Sound Impressions Users Guide, pp. 1–7 and 9–1, 1993.*
MediaVision, Monologue Users Manual, title page, 1992.*
MediaVision, ExecuVoice Users Guide, pp. 2–2, B–3, 1993.*
L. Stifelman, "VoiceNotes: An Application for a Voice–Controlled Hand–Held Computer", Massachusetts Institute of Technology (pp. 4–6, 19–20, 23–29, 49–50, 57, 71–81, 83–84, 118–120) (Jun., 1992).

* cited by examiner

Primary Examiner—Tālivaldis Nars Smits
Assistant Examiner—Donald L. Storm
(74) Attorney, Agent, or Firm—Samuels, Gauthier & Stevens, LLP

(57) ABSTRACT

A method and apparatus for storing and retrieving information to and from a memory of a hand-held audio database device. The audio database device includes a graphics display provided on a hand-held housing for displaying graphical information. A microphone and a speaker are provided on the housing to receive and broadcast audio information from and to a user, respectively. The audio database device includes a memory configured to store graphical icons and to support a hierarchical memory structure comprising categories, wherein the icons graphically represent the categories. A user-actuated navigation control is provided on the housing and permits a user to navigate the categories in the hierarchical memory structure and to select a desired category. A processor is coupled to the memory, the display, and the navigation control and effects displaying of one of the icons on the display when the user is navigating a corresponding one of the categories, and storing of the audio information in the desired category of the memory.

21 Claims, 32 Drawing Sheets

| MEMORY OBJECT STRUCTURE ||| 
|---|---|---|
| OBJECT NAME | PROPERTIES | COMMENT |
| Free | None | Object is erased and available to be converted into another object. |
| Bad | None | Object is defective and should not be used. |
| Header | Channel number; time/date stamp; unique ID number; alarm type and status; size; voice data; text data | Object is the start of a message |
| Body | Unique ID number; sequence order | Object contains additional voice data or text data for a given Header, Phone or Prompt |
| Phone | Channel number; time/date stamp; unique ID number; size; 3 phone numbers (20 digits each) | Object holds the voice prompt label for a contact |
| Prompt | Channel number; unique ID number; icon; password; size; voice data; text data | Object holds the voice prompt label for a message channel |
| Help | Index for each prompt; size of each prompt; voice data; text data | Object holds fixed voice prompts for help messages. Help objects are not relocated after they are created. |
| System | Passwords; icons; system settings. | Object holds passwords and system settings. There is only one system object, therefore, no unique ID number is required. |

*FIG. 26*

PORTABLE AUDIO DATABASE DEVICE WITH ICON-BASED GRAPHICAL USER-INTERFACE

FIELD OF THE INVENTION

The present invention relates generally to portable audio storage systems, and more particularly, to a portable audio database device employing a hierarchical audio database and an icon-based user-interface.

BACKGROUND OF THE INVENTION

Various portable audio recording devices have been developed that permit a user to store and retrieve audio messages to and from the device. Recent advancements in digital integrated circuit technology have resulted in the manufacture of solid-state memory ICs that are often incorporated into such recording and playback devices. Two such conventional audio recording devices are disclosed in U.S. Pat. Nos. 5,491,774 and 5,359,698.

Although these and other conventional audio recording devices typically permit a user to record a limited number of messages in a common memory area, such devices offer little or no capability to organize the recorded messages. Further, conventional audio recording devices typically employ a relatively primitive user-interface that generally limits the degree to which a user may interact with the device. A typical user-interface for a portable audio recording device generally includes a number of manually actuated switches that control device operations and one or more LEDs that are transitioned between an ON state and an OFF state. Although currently available audio recording devices may offer a number of useful features, the primitive nature of such conventional user-interfaces often discourages many users from exploiting all but the most basic of available features. More sophisticated functions are often not incorporated into such portable audio recording devices, since accessing and executing such functions is often made impracticably cumbersome due to the limitations of conventional user-interfaces.

A common deficiency inherent in many conventional portable audio recording devices is the present inability of such devices to effectively manage large volumes of audio information. Conventional audio recording devices are generally unable to effectively manage a large number of independent audio recordings of varying types in an organized manner. Although various known personal computer software applications, such as most currently available word processors, are generally capable of managing a large number of text files, the problem of effectively organizing and managing a large number of audio recordings stored in a portable audio recording device remains unsolved.

There exists a need for a portable device that is capable of organizing and managing a large number of audio recordings in an effective and efficient manner. There exists a further need for an intuitive user-interface for such a device that permits a user to exploit a wide variety of simple and sophisticated functions. The present invention fulfills these and other needs.

SUMMARY OF THE INVENTION

The present invention is a method and apparatus for storing and retrieving information to and from a memory of a hand-held audio database device. The audio database device includes a memory configured to support a hierarchical memory structure for categorizing and storing audio information. The audio database device further includes a graphics display provided on a hand-held housing for displaying graphical information. A microphone and a speaker are provided on the housing to receive and broadcast audio information from and to a user, respectively. A memory in the audio database device is configured to store graphical icons, wherein the icons graphically represent the categories within which audio and, if applicable, text information is stored. A user-actuated navigation control is provided on the housing and permits a user to navigate the categories in the hierarchical memory structure and to select a desired category. A processor is coupled to the memory, the display, and the navigation control and effects displaying of one of the icons on the display when the user is navigating a corresponding one of the categories, and storing of the audio information in the desired category of the memory.

The system memory is a non-volatile memory, such as flash EEPROM memory, and stores audio, textual, graphical information. One or more external modular memories may be coupled to the housing to provide increased information storage capacity or may be employed to store application programs or other information received from an external information source. An object-based operating system may be implemented in which information objects are associated with the audio information and prompt objects are associated with the icons. The audio database device may also include a communications adapter coupled to the processor to communicate the audio information to a device external to the audio database device. A voice conversion device may be coupled to the processor to convert the audio information received from the user to corresponding command signals, wherein the processor effects navigation of the categories in the hierarchical memory structure and selection of the desired category using the command signals.

Further, a voice conversion device may be coupled to the processor to convert the audio information received from the user to corresponding ASCII information. The audio database device may also include a text conversion device to convert text information stored in the memory to corresponding audio information. Cooperative operation between the graphical interface display panel and the navigation control permits a user to efficiently move audio information, verbal labels and icons between categories.

BRIEF DESCRIPTION OF THE DRAWINGS

FIG. 26 is a chart describing various memory objects and object structures supported in the memory of the portable audio database device;

DETAILED DESCRIPTION OF THE EMBODIMENTS

Figure 1:
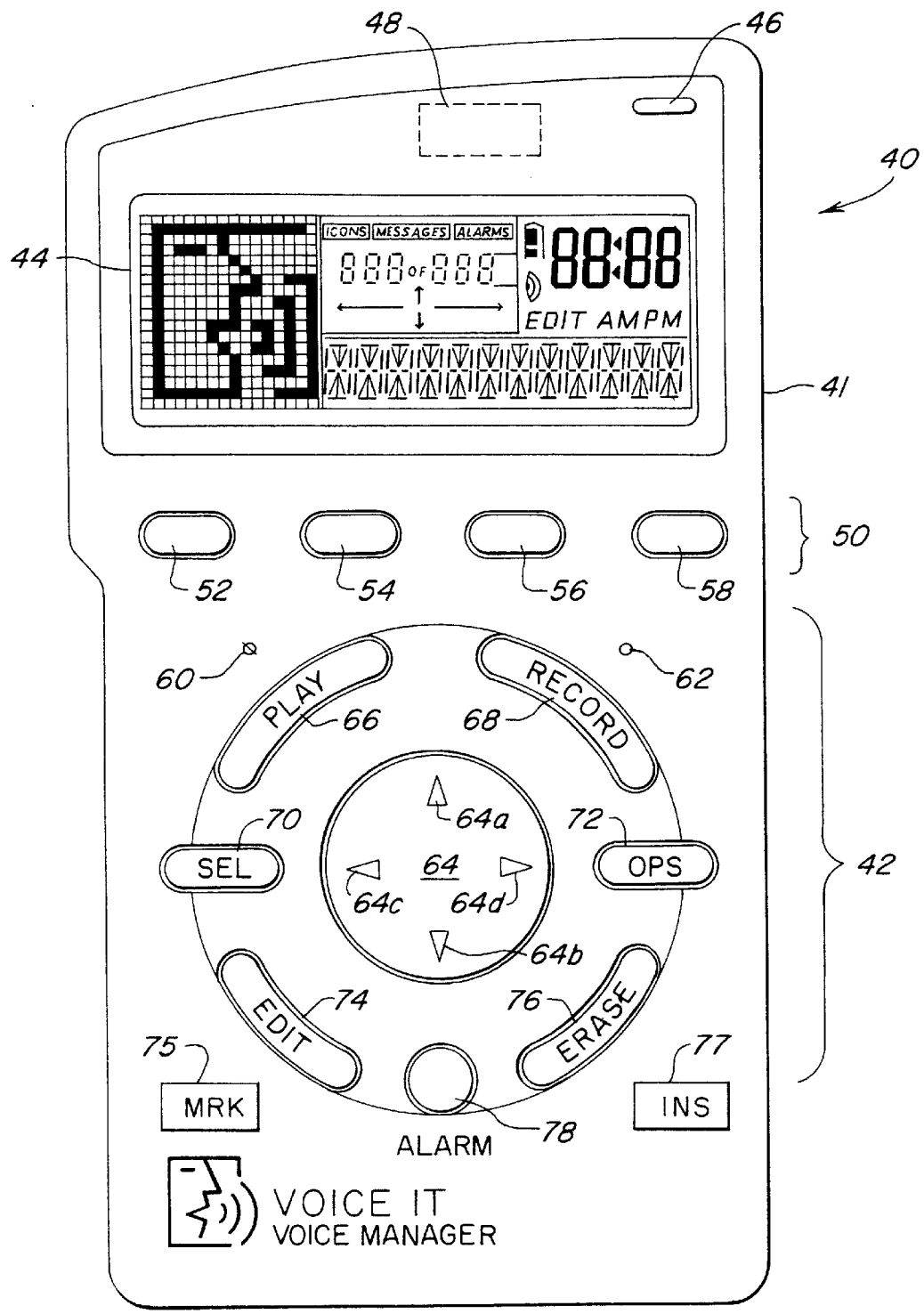
FIG. 1 is an illustration of a portable audio database device employing an icon-based graphical user-interface and hierarchical filing structure.
Figure 2:
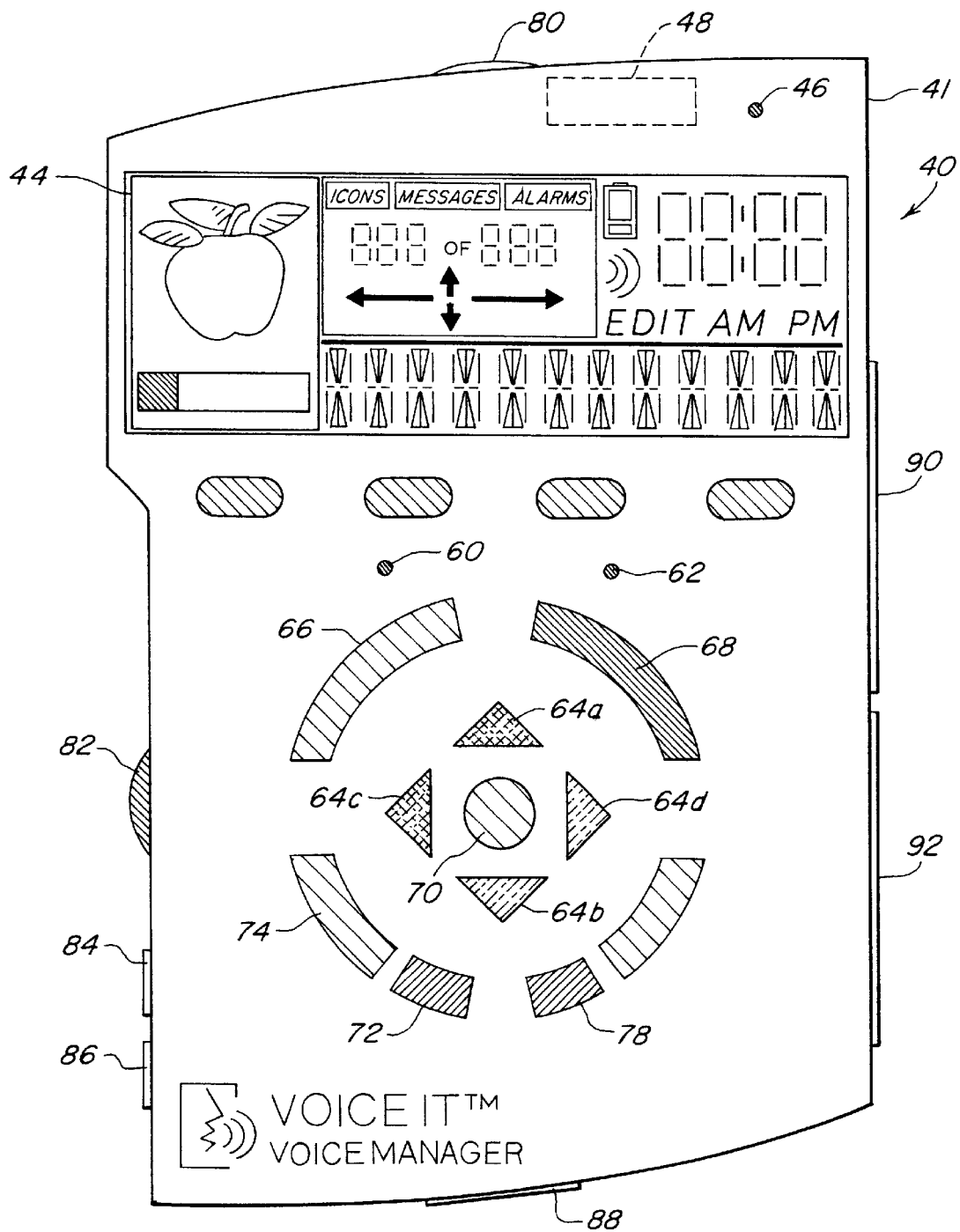
FIG. 2 is another embodiment of the portable audio database device illustrated in FIG. 1.

Referring now to the drawings, and more particularly, to FIGS. 1–2, there is illustrated two embodiments of a portable audio database device 40 employing an audio/graphical user-interface. In general, the embodiments provided for purposes of illustration in FIGS. 1–2 provide for efficient organization and management of audio information by employing an audio database organized in memory as a hierarchical filing structure for associating audio information with particular categories and sub-categories. The unique hierarchical filing structure provides for the selective storage of a large number of independent audio recordings in a pre-established hierarchical categorization scheme. The icon-based filing structure advantageously provides a user the ability to expand, alter, or otherwise modify the pre-established scheme, thereby offering to the user an enhanced audio information organizing capability that provides a flexible storage structure that may be readily customized by the user. In addition to storing audio recordings, the icon-based filing structure also accommodates storage and management of text information, such as ASCII data and files.

Audio and text information stored in the portable audio database device 40 may be provided directly from the user or from an information source external to the portable audio database device 40, such as a computer database, other storage medium, or a network. In general, a user interacts with the portable audio database device 40 by perceiving graphical, textual, or verbal prompts, or a combination of these prompts, provided by an interface display panel 44 and, if applicable, a speaker 48. A user typically responds to the various prompts by using of one or more switches or buttons provided on the housing 41 of the portable audio database device 40. A user may also interface with the device 40 by issuing verbal input commands which are converted into corresponding control signals that effect a desired function.

An advantageous interfacing feature provided by the portable audio database device 40 is the use of graphical icons that are presented on the interface control panel 44 and represent particular information categories and/or functions. The graphical icons presented on the interface control panel 44 provide for an intuitive visual interface that permits a user to easily associate a particular graphical representation with a corresponding storage category or function. The icon-based user-interface provides the user an ability to efficiently navigate through various categories and types of information stored in the portable audio database device 40.

In accordance with the embodiments illustrated in FIGS. 1 and 2, the portable audio database device 40 includes a housing 41 which is configured to fit comfortably in a user's hand. An interface display panel 44 is provided on the housing 41 and is of a size sufficient to be readable while holding the portable audio database device 40 in one's hand. Also included on the housing 41 is a microphone 46 for receiving verbal commands and audio information from a user. A speaker 48 is provided on the rear side of the housing 41 or, alternatively, on another portion of the housing 41, and reproduces verbal prompts, user recorded information, audio information received from an external information source, telephone dial tones, and the like.

An important feature of the portable audio database device 40 concerns, in particular, the hierarchical filing structure within which audio information and, if applicable, graphical and text information, is categorized in a hierarchical fashion. Further, the various functions performed by the portable audio database device 40 are similarly presented in an indentured manner, with, for example, a primary function having a number of associated sub-functions defined thereunder which are generally accessed by initial invocation of the primary function. Individual graphical icons are associated with each primary function and each of its associated sub-functions. The icons provide the user with an intuitive understanding of the particular function or sub-function being made available to the user. Additionally, each of the functions and sub-functions may also include a verbal or audio prompt which, together with, or exclusive of, a corresponding icon, provides a user with additional information concerning a particular function or sub-function.

It is noted that information categories are organized in the same way as the above-described functions and sub-functions. It is further noted that a function or sub-function is generally executed to access a corresponding category or sub-category. The intuitive icon-based filing structure thus provides an intuitive means for navigating the categories, sub-categories, functions, sub-functions, and audio, and graphical text information stored in the hierarchical filing structure supported in the memory of the portable audio database device 40.

The icon-based user-interface of the portable audio database device 40 further includes a number of buttons that allow a user to manually interact with the device. In particular, four home keys 50 are disposed below the interface display panel 44 and, as discussed hereinbelow, allow the user to quickly access pre-established or user-defined locations or categories in the hierarchical filing structure. By way of example, home key 52 may be activated to access a To-Do category, while home key 54 may be pressed to access an Ideas category. By way of further example, home keys 56 and 58 may be pressed to activate a respective pre-defined or user-defined programmed macros that executes a particular series of programmed button-strokes or other executable program steps. A unique icon may be assigned by the user to each of the home keys 52, 54, 56, 58, respectively, which is displayed on the interface display panel 44 when a particular home key is activated.

A control panel 42 is provided on the housing 41 which includes a number of user-actuated switches. A record button 68 may be actuated to permit the recording of audio information received by the microphone 46. A play button 66 may be actuated by the user to playback audio information stored in the portable audio database device 40 or to display text information stored therein. An erase button 76 may be actuated to selectively erase audio information associated with a particular information category or information associated with any number of categories. An editing button 74 provides a user the ability to modify information entered by the user, such as time or date information, and also permits the user to selectively edit audio and text information. An alarm button 78 allows the user to establish various types of alarms associated with selected messages. A select/enter button 70 allows the user to enter and confirm user inputs and to select a particular information category when navigating the hierarchy of information and function categories. An options button 72 may be activated to access a particular function category. A function selected from the function category may then be executed by pressing the select/enter button 70.

A mark button 75 is actuated when marking an audio message or program when performing various enhanced editing operations, including indexing, inserting, deleting, moving, and copying. By way of example, a user may press the mark button 75 at a first location while playing an audio program, and press the mark button 75 once again at a second location in the audio program. The tagged audio program portion defined between the first and second locations may then be copied, deleted, moved, or otherwise modified using an appropriate button or buttons. An index flag, for example, may be established at a particular audio program or message location by pressing the mark button 75. A search of the flag may later be performed to return to the flagged location. An insert button 77 may be actuated when inserting audio information into a pre-existing audio program or message. The insert and mark buttons 77 and 75 may be used in cooperation, and with other buttons, to mark, copy, move, and insert audio program segments between audio programs and messages.

A navigation control panel 64 includes four navigation keys that permit a user to navigate through the hierarchical filing structure in a number of different directions. The navigation control panel keys are also employed when reviewing and accessing information stored in the portable audio database device 40, and when programming various device functions. The navigation control panel 64 includes an Up key 64a, a Down key 64b, a Left key 64c, and a Right key 64d. An advantageous feature provided through cooperative operation between the interface display panel 44 and the navigation control panel 64 concerns the displaying of direction indicators that inform the user as to which of the four navigation control panel keys are presently available for actuation. By way of example, the interface display panel 44 shown in FIGS. 1 and 2 includes a depiction of four direction arrows near the center of the interface control panel 44. Presentation of the four direction indicator arrows indicates to a user that all four of the navigation control panel keys are available for actuation.

As will be discussed in detail hereinbelow, the number of available navigation control panel keys which can be actuated during a particular operation will vary between zero (i.e., no navigation control panel keys are actuatable) and four (i.e., all navigation control panel keys are actuatable). The cooperation between the direction indicator arrows presented on the interface display panel 44 and the navigation control panel 64 provides for enhanced navigability of the icon-based filing structure and usability of the various functions provided by the portable audio database device 40.

With particular reference being made to FIG. 2, the portable audio database device 40 includes a volume control 82 which may be manipulated by a user to vary the broadcast volume of the audio information being reproduced by the speaker 48. A headphone jack 84 is provided on the housing 41 which allows the user to couple a headset to the portable audio database device 40 which, in one embodiment, automatically deactivates the speaker 48, thereby providing audio information to the user solely through the headset coupled to the headphone jack 84. An AC adapter jack 86 is also provided on the housing 41 for receiving an AC power line to provide power to the portable audio database device 40 from a source other than the batteries disposed in the housing 41.

Figure 31:
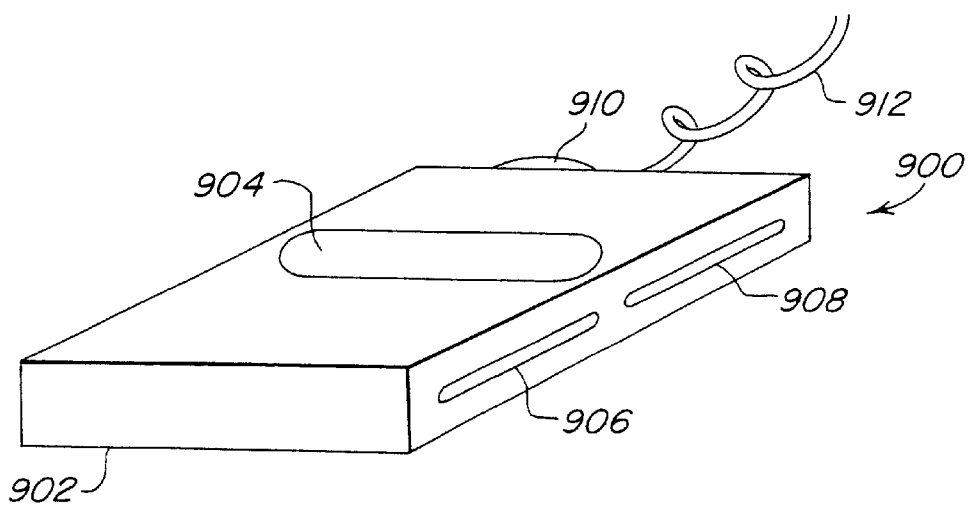

A docking connector 88 is provided on the housing 41 and adapted to receive a mating connector provided on a communication line which couples the portable audio database device 40 to a docking station, such as that shown in FIGS. 31 and 32. An infrared (IR) communications interface 80 is provided on the housing 41 and includes a protective lens. A pair of memory card slots 90 and 92 are also provided on the housing 41, each of which may accommodate a removable memory card or module. In one embodiment, the memory card slots 90 and 92 conform to a PCMCIA standard. Also provided on the housing 41 is a green LED 60 which is illuminated when the play button 66 is actuated, and a red LED 62 which is illuminated when the record button 68 is actuated. In one embodiment, the red LED 62 flashes in response to one of several error conditions.

Figure 3:
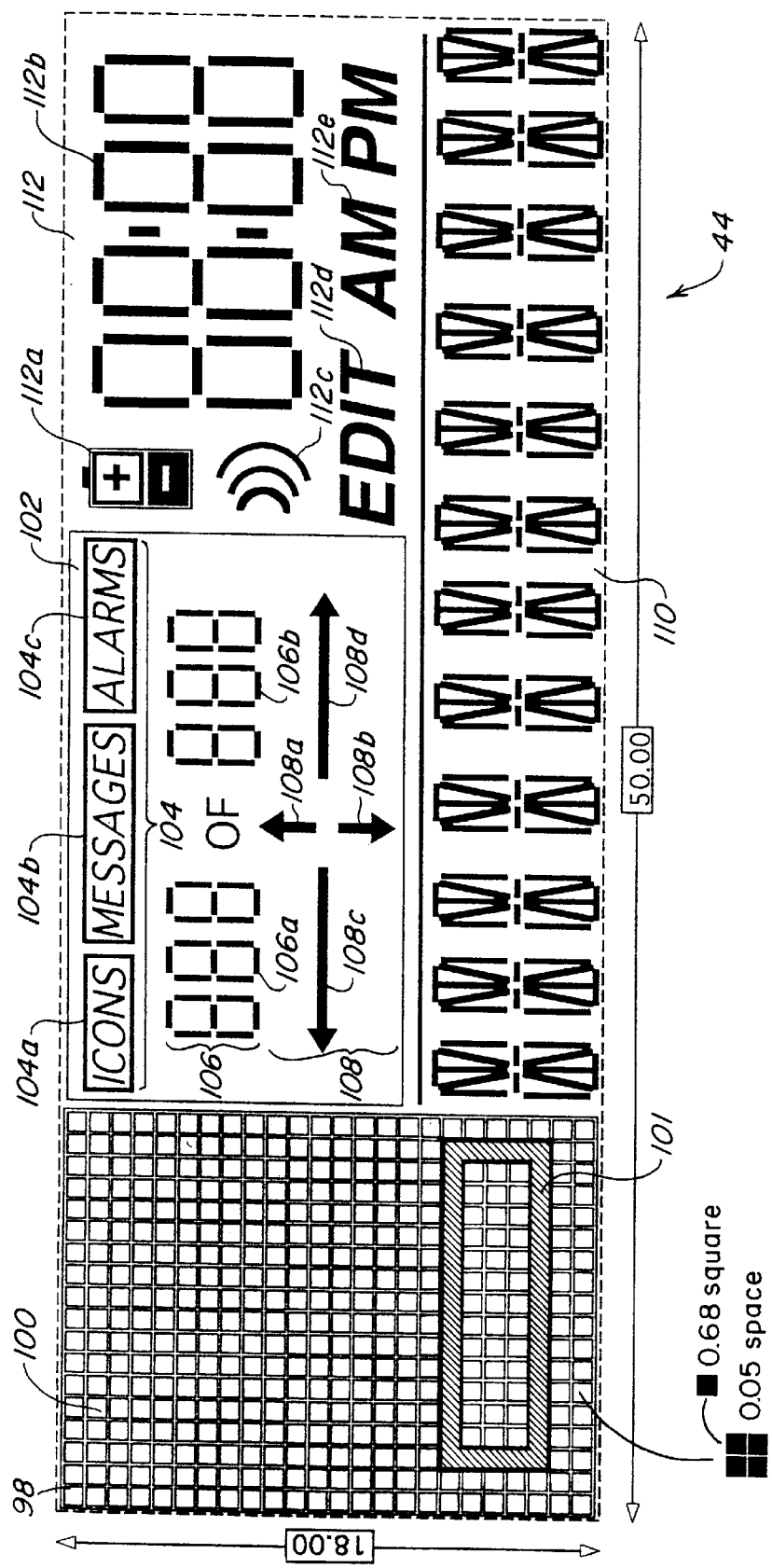
FIG. 3 illustrates an embodiment of a graphics display employed as part of an icon-based user-interface for a portable audio database device.

Turning now to FIG. 3, there is illustrated an embodiment of the interface display panel 44 shown in FIGS. 1 and 2. The interface display panel 44 is a graphics display, such as an LCD display. The interface display panel 44 is preferably segmented into a number of display regions or windows, each of which communicates a particular type or types of information to a user. A graphical display region 98 is a region employed to display relatively high resolution graphics, such as graphical icons which are presented in an icon window 100 of the graphical display region 98. The graphical display region 98 is also used to present a memory status indicator 101 which visually indicates the relative percentage of memory utilization currently available or used. The interface display panel 44 further includes a category information window 102, an alphanumeric information window 110, and an operating information window 112. The category information window 102 presents various types of information concerning available or selected information categories or functions, the current number and total number of messages or function levels associated with a particular category, and an indication as to the available navigation control panel keys 64 which may be actuated by a user at a particular processing level.

The category information window 102 includes an Icons indicator 104a, a Messages indicator 104b, and an Alarms indicator 104c. A Number indicator 106 includes a current message or function level number indicator 106a and a total message or function level number indicator 106b. By way of example, the Number indicator 106 may read "2 of 5", thereby indicating that the second of five audio messages is currently accessible when the Messages indicator 104b is displayed, or that the second of five functions or function levels is accessible when the Icons indicator 104a is displayed. By way of further example, the number indicator 106 may read "3 of 8", indicating that the third of eight alarms is accessible when the Alarms indicator 104c is displayed in the category information window 102.

A Direction indicator 108 communicates to the user the available directions by which the user may scroll or navigate through information and function selections. In particular, the Direction indicator 108 includes an Up direction indicator 108a, a Down direction indicator 108b, a Left direction indicator 108c, and a Right direction indicator 108b. As mentioned previously, the direction indicator 108 communicates to the user which of the navigation control panel keys 64 are actuatable during a particular operation. The operating information window 112 includes a battery status indicator 112a, a Time display 112b, an Alarm indicator 112c, an Edit mode indicator 112d, and an AM/PM indicator 112e. Various types of alphanumeric information is presented to a user in the alphanumeric information window 110.

Figure 4:
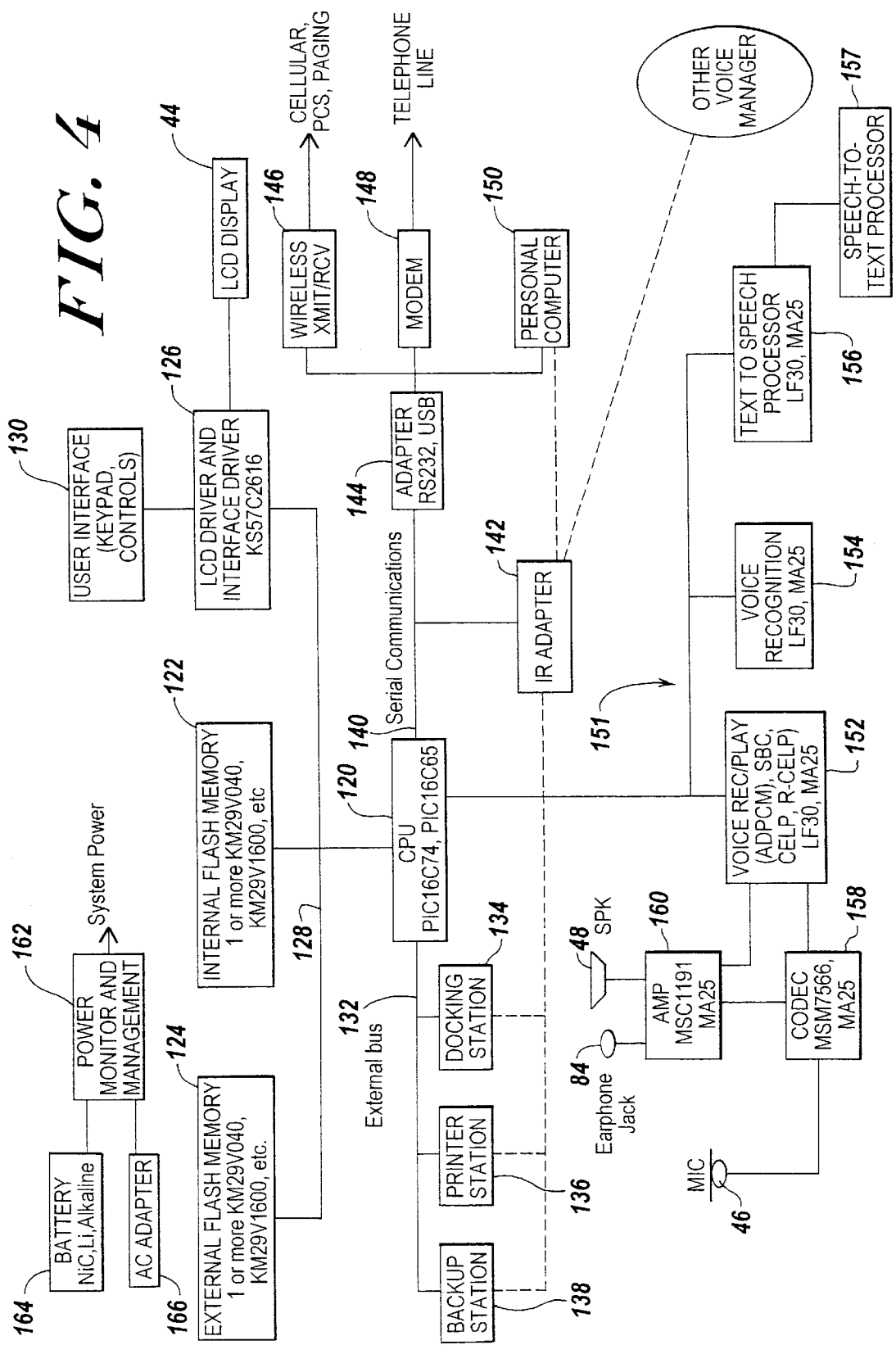
FIG. 4 is a system block diagram of a portable audio database device in accordance with one embodiment of the present invention.
Figure 5:
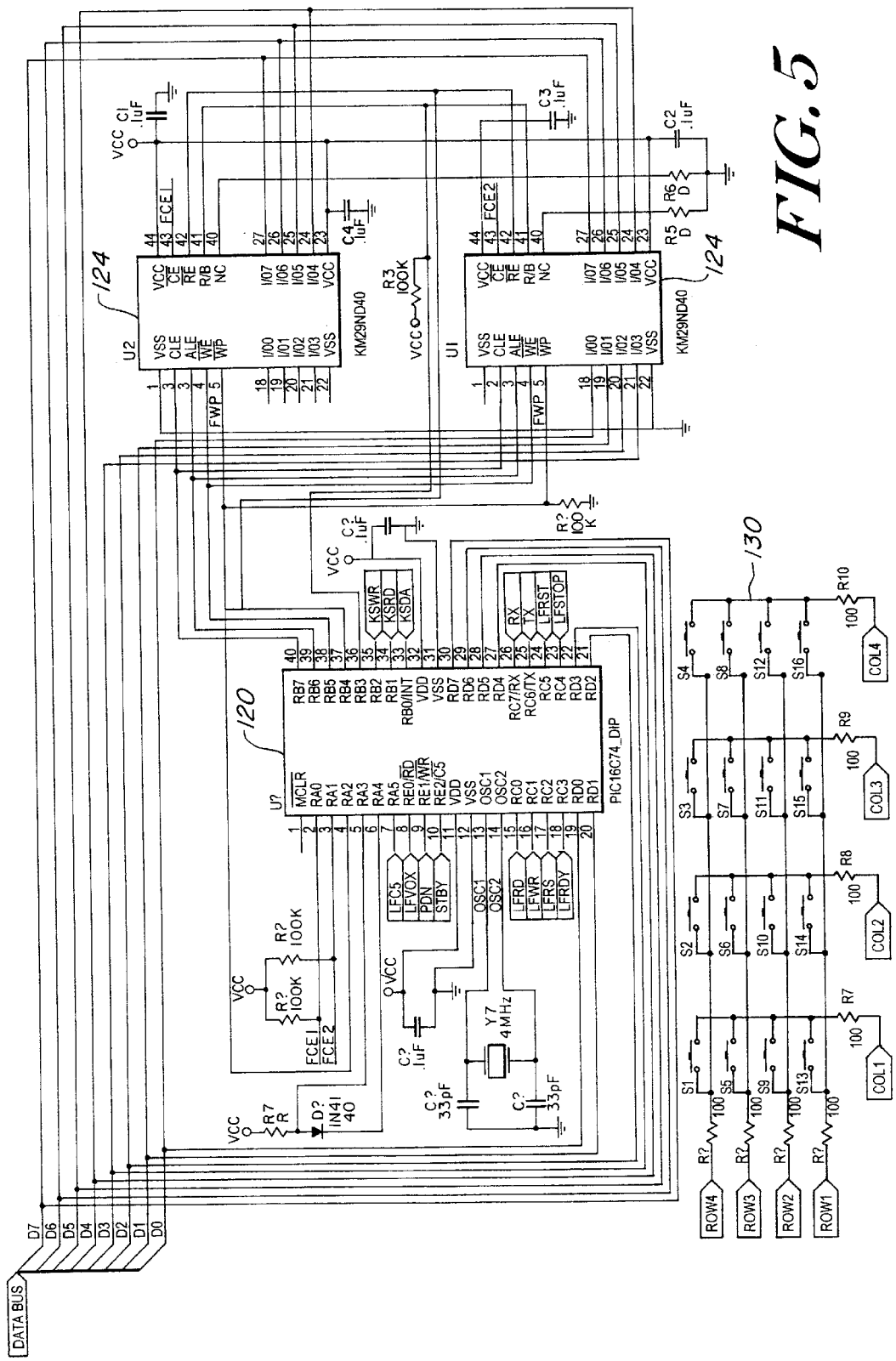
FIGS. 5–7 are schematics illustrating various internal components and interconnections between components in accordance with one embodiment of a portable audio database device.
Figure 6:
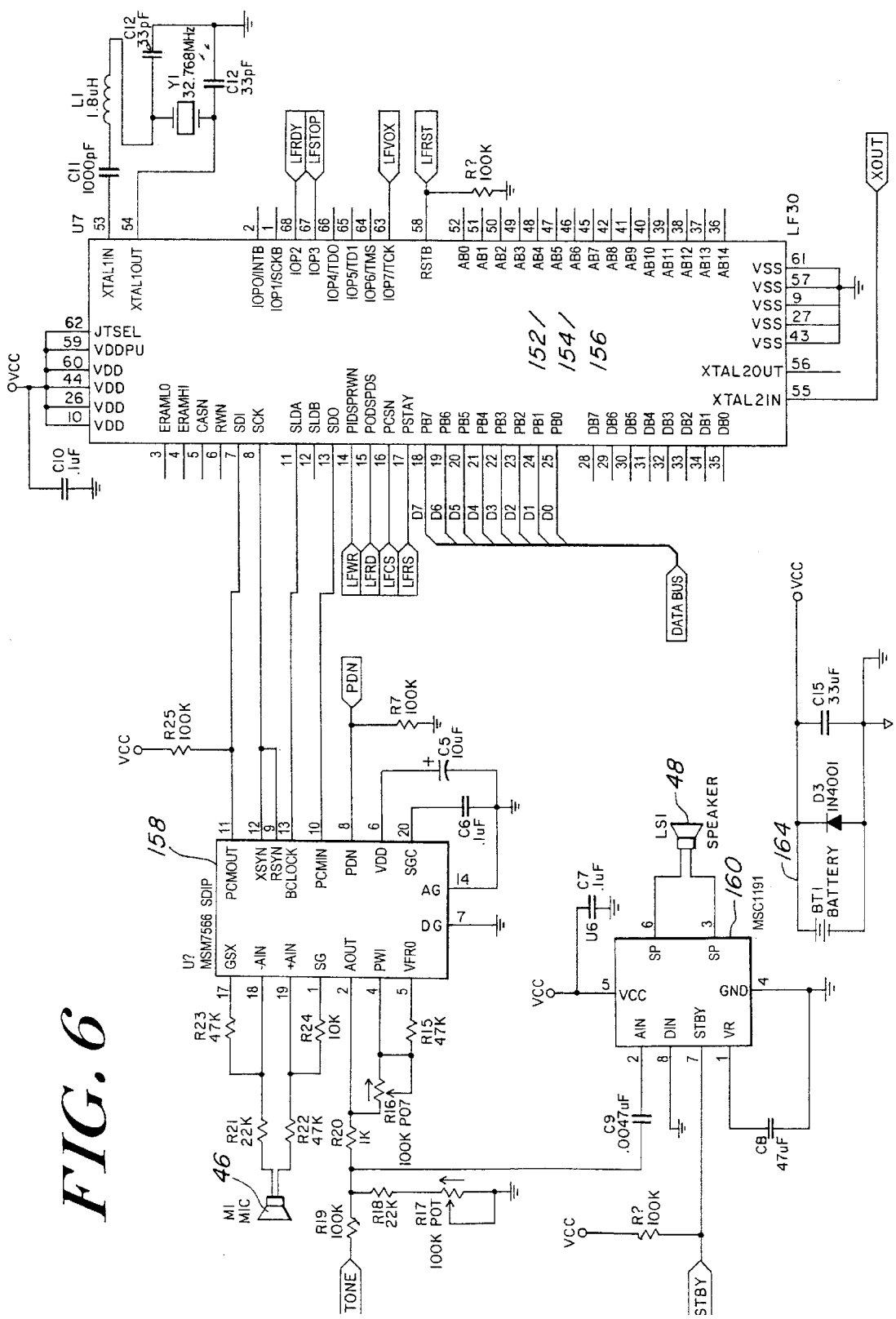
Figure 7A:
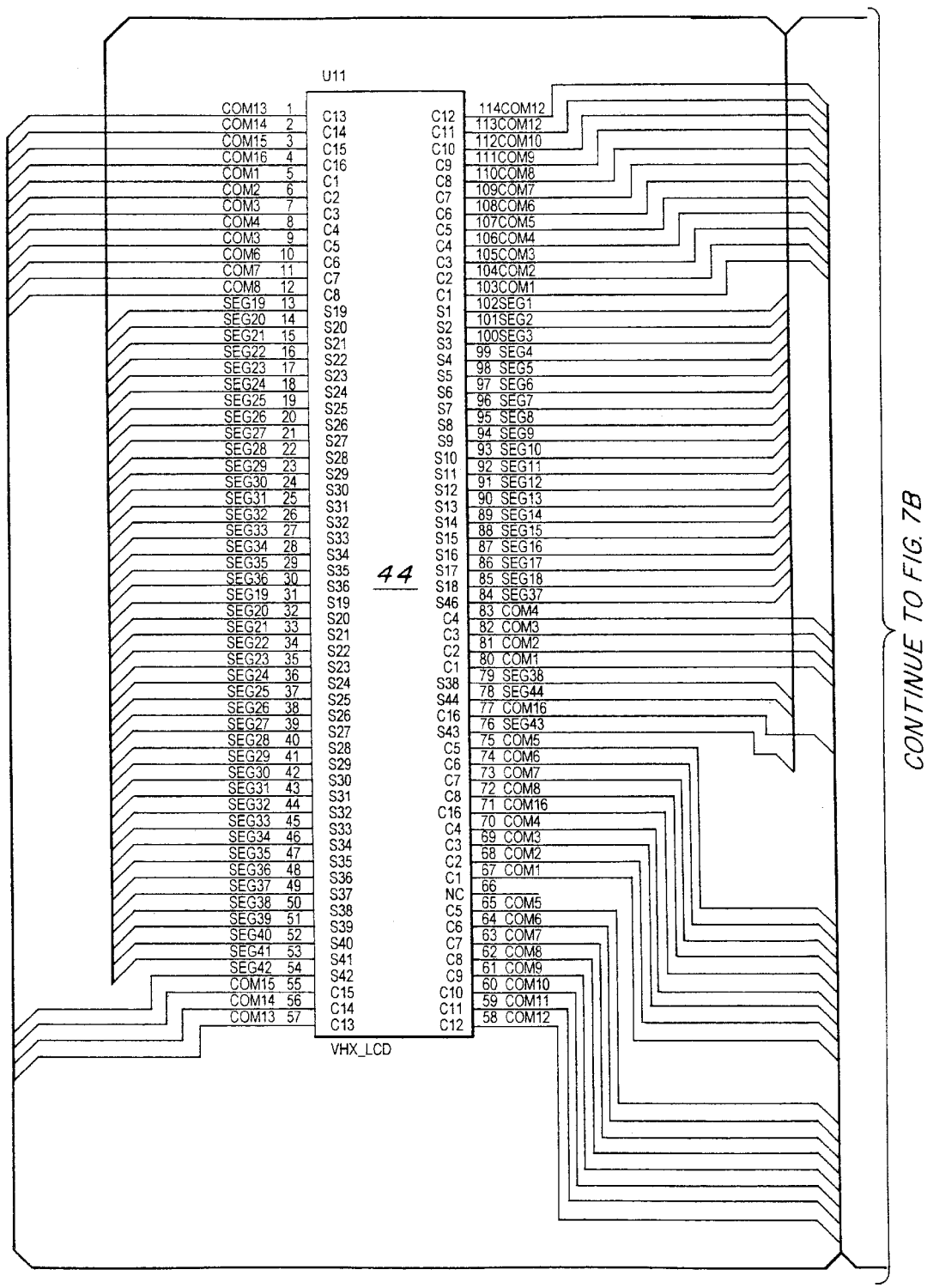
Figure 7B:
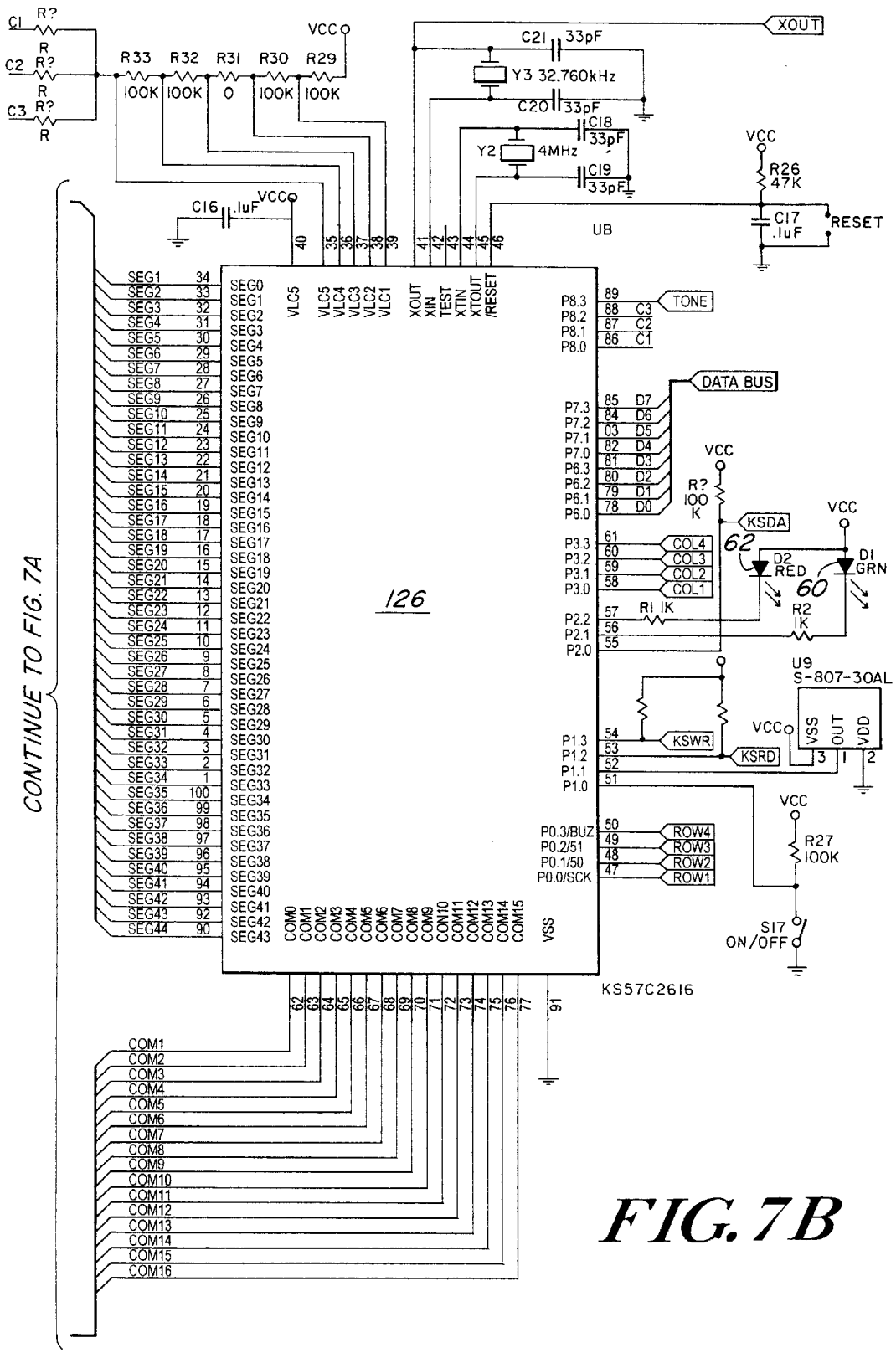

Referring to FIG. 4, there is illustrated a system block diagram of various components comprising the portable audio database device 40 in accordance with one embodiment of the invention. FIGS. 5–7 illustrate in schematic form the embodiment of the portable audio database device 40 illustrated in FIG. 4. The central processing unit (CPU) 120 communicates with an internal flash memory 122 which is configured to store various types of information, including voice and audio information, text information, and graphical information. It is noted that graphical icons may be stored in the flash memory 122, in a ROM memory of the CPU 120, or other non-volatile memory of the portable audio database device 40. As will be discussed in detail hereinbelow, a unique object-oriented memory management scheme may be employed to efficiently manage different types of information, and to manage associations or links between various types of information. It is to be understood that various types of non-volatile memories other than flash memory may be employed. Non-volatility, programmability, and low-power consumption are desirable characteristics that make flash memory particularly well-suited for use in the portable audio database device 40. The system memory 122 preferably includes one or more model KM29V040 or KM29V1600 type flash memory devices manufactured by Samsung Electronics Corporation.

The CPU 120 is coupled to an LCD/interface driver 126 by way of an internal bus 128. The LCD/interface driver 126 drives both a keypad 130 provided on the housing 41, as well as the LCD interface display panel 44. It can be appreciated by those skilled in the art that the keyboard 130 and the LCD interface display panel 44 may be controlled by independent interface and LCD drivers, respectively. A suitable LCD/interface driver is model KS57C2616 manufactured by Samsung Electronics Corporation.

Another aspect of the present invention concerns an external memory module 124 which, when received by either one of the memory card slots 90 or 92, communicates with the CPU 120 over the internal bus 128. As will be discussed in greater detail hereinbelow, one or more external memory modules 124 may be coupled to the CPU 120 for purposes of storing, retrieving, and exchanging various types of information, including audio, text, graphics, and other types of information. In certain applications, an external memory module 124 may be coupled to the CPU 120 to provide additional information storage capacity beyond that provided by the system memory 122. In other applications, an external memory module 124 may be pre-loaded with various types of information provided from an external information source, such as a computer database, and which, when coupled to the internal bus 128, makes such information stored in the external memory module 124 available to the CPU 120.

Further, an external memory module 124 may contain one or more application programs which can be transferred to another external memory module 124, or transferred to the system memory 122 for subsequent execution by the CPU 120. Such an application program typically includes a pre-established icon-based filing structure with associated icons and functions used by the CPU 120 and memory 122 when the application program is executed by the CPU 120. Invocation of a particular application program transferred form the external memory module 124 to the system memory 122, or accessed directly by the CPU 120, is typically invoked in the same manner as other functions, such as by incrementing through available functions and, when identifying a function typically by observing its associated icon, selecting the application program for execution using the select/enter button 70 of the command panel 42.

The portable audio database device 40 also includes a communications bus 140 which couples the CPU 120 selectively between the communications line adapter 144 and an (IR) adapter 142. The communications line adapter 144 provides the CPU 120 the capability to communicate with various types of external communication systems and computing devices using, for example, any one of a wireless transceiver 146, a modem 148, and a computer interface 150. The wireless transceiver 146 may be employed to couple the CPU 120 to a cellular phone, a personal computer, a paging device, and the like equipped with a suitable transceiver. The modem 148 may be selectively accessed to couple the CPU 120 to a telephone or data line, such as a standard analog line or an ISDN line. The computer interface 150 may be employed to couple the CPU 120 to a personal computer, other type of computing or peripheral device, or with various other types of information systems such as a network.

The IR adapter 142 may be employed to couple the CPU 120 to many types of devices, including a personal computer 150, another portable audio database device 40, or various other external systems and devices equipped with a suitable IR transceiver. In particular, the IR adapter 142 may be employed to couple the CPU 120 to a backup station 138, a printer station 136, or a docking station 134, embodiments of which are illustrated in FIGS. 31 and 32. The CPU 120 may communicate to the backup station 138, printer station 136, or docking station 130 over an external bus 132, rather than through the IR adapter 142. In one embodiment, more than one CPUs 120 may be employed to provide enhanced functionality and parallel processing capability. A suitable CPU is model PIC16C74 or PIC16C65, manufactured by Microchip Technology, Inc.

The CPU 120 is also coupled to a voice processing circuit 151 which processes voice, audio, and text information input to, and output from, the portable audio database device 40. In particular, a coder/decoder (CODEC) 158 is coupled to a microphone 46 and codes audio signal information received by the microphone 46 in conformance with one of a number of known coding standards. In general the CODEC 158 codes input analog signals received from the microphone 46 into a format, often referred to as a compressed format, that provides for efficient storage of the received information in the memory 122. The CODEC 158 is coupled to an amplifier 160 which, in turn, is coupled to both an earphone jack 84 and a speaker 48. In this configuration, the CODEC 158 decodes previously coded audio information into an analog format suitable for transmission to, and broadcast over, a speaker 48 or headset coupled to the earphone jack 84. It is noted that audio and other information stored in the memory 120 may be coded by the CODEC 158 prior to transmitting the information to an external device or system.

The voice processing circuit 151 processes voice and text data of various forms, including non-encoded and coded data, PCM, ADPCM, wav file forms, SBC, CELP, RE-CELP, ASCII and other text forms, for example. It is to be understood that this list of data types processed by the portable audio database device 40 is not exhaustive. The voice processing circuit includes an audio signal processor 152, a voice recognition processor 154, and a text-to-speech processor 156, each of which is coupled to the CPU 120. A speech-to-text processor 157 may also be coupled to the CPU 120. The audio signal processor 152 processes audio signal information received from the microphone 46 and/or the CODEC 158 into a form appropriate for storage in the system memory 122 and/or transmission to an external system or device.

A voice recognition processor 154 coupled to the CPU 120 provides a user-independent and a user-dependent voice recognition capability. In one embodiment, the voice recognition processor 154 converts a verbal command issued by the user and received by the microphone 46 into a corresponding command signal which, when processed the CPU 120, effects a particular function corresponding to the verbal command. Cooperation between the CPU 120 and the voice recognition processor 154 provides a user the ability to operate the portable audio database device 40 solely by issuing appropriate voice commands. A general methodology for implementing a user-independent and user-dependent voice recognition interface that may be employed is disclosed in U.S. Pat. No. 5,794,205 which is assigned to the assignee of the present application, the contents of which is incorporated herein by reference.

Another advantageous feature of the portable audio database device 40 concerns the capability of converting verbal input data into corresponding ASCII character data, which may then be presented on the interface display panel 44 and/or stored in the system memory 122. By way of example, a user may utter a phone number which is received by the microphone 46 and processed by the voice recognition processor 154 into corresponding ASCII characters. This conversion may also be accomplished by the speech-to-text processor 157. It is noted that user-independent voice recognition may be used when performing voice recognition on phone number characters, while user-dependent voice recognition may be used when performing voice recognition on contact names. Generally, the extent to which user-independent voice recognition may be used is limited by the amount of memory that can be allocated for storing user-independent voice recognition word set information. Since the number of possible digits and characters associated with phone numbers is limited, user-independent voice recognition processing of phone numbers is considered desirable if sufficient memory storage capacity is available. It is to be understood that user-independent voice recognition may be applied to other audio information, and is not limited in use solely to phone number information.

After a phone number has been converted into an ASCII format and stored in the system memory 122 or, if desired, an external memory module 124, the phone number subsequently may be recalled from the memory 120. The recalled phone number may then be displayed on the interface display panel 44. Further, a user may direct the retrieved phone number to be broadcasted over the speaker 48 as a corresponding series of telephonic dial tones which, when received by a telephone handset in proximity with the speaker 48, effectuate dialing of the corresponding phone number.

Other functions made available to the user by employment of the voice recognition processor 154 or speech-to-text processor 157 include performing searches on information stored in the portable audio database device 40 using voice commands; labeling of messages by voice command; performing string searches on text information; and effecting a voice print function which allows access to protected information only upon issuing a user-dependent password by a user having a matching voice print associated with the password.

A text-to-speech processor 156 provides the capability to convert text information stored in the system memory 122 or external memory 124 into a corresponding synthesized speech pattern. Further, text information received over the communications bus 140 or external bus 132 may also be converted to a corresponding synthesized speech pattern by the text-to-speech processor 156. A particularly useful application of the text-to-speech conversion capability will be later discussed in reference to FIG. 29.

In some situations, such as when driving a vehicle and recalling a telephone number from the portable audio database device 40, it may be undesirable to recall information from the system memory 122 and present such information to the user solely by use of the interface display panel 44. In such a situation, a telephone number may be recalled from system memory 122 using appropriate voice commands, transferred to the text-to-speech processor 156, and broadcaster over the speaker 48 in a synthesized speech format or a series of dial tones which can be applied to a cellular telephone microphone for purposes of effecting a telephone call.

By way of further example, text information stored in an external memory module 124 may be broadcasted to the user as corresponding synthesized speech by cooperative operation between the voice recognition processor 154 or the text-to-speech processor 156 and the CPU 120. The speech-to-text processor 157 may be employed to convert voice data, such as messages, alarms, and other verbal information, into corresponding text, which may be presented on the interface display panel 44 or communicated to another device, such as a personal computer or a printer, via the communications bus 140.

Figure 8A:
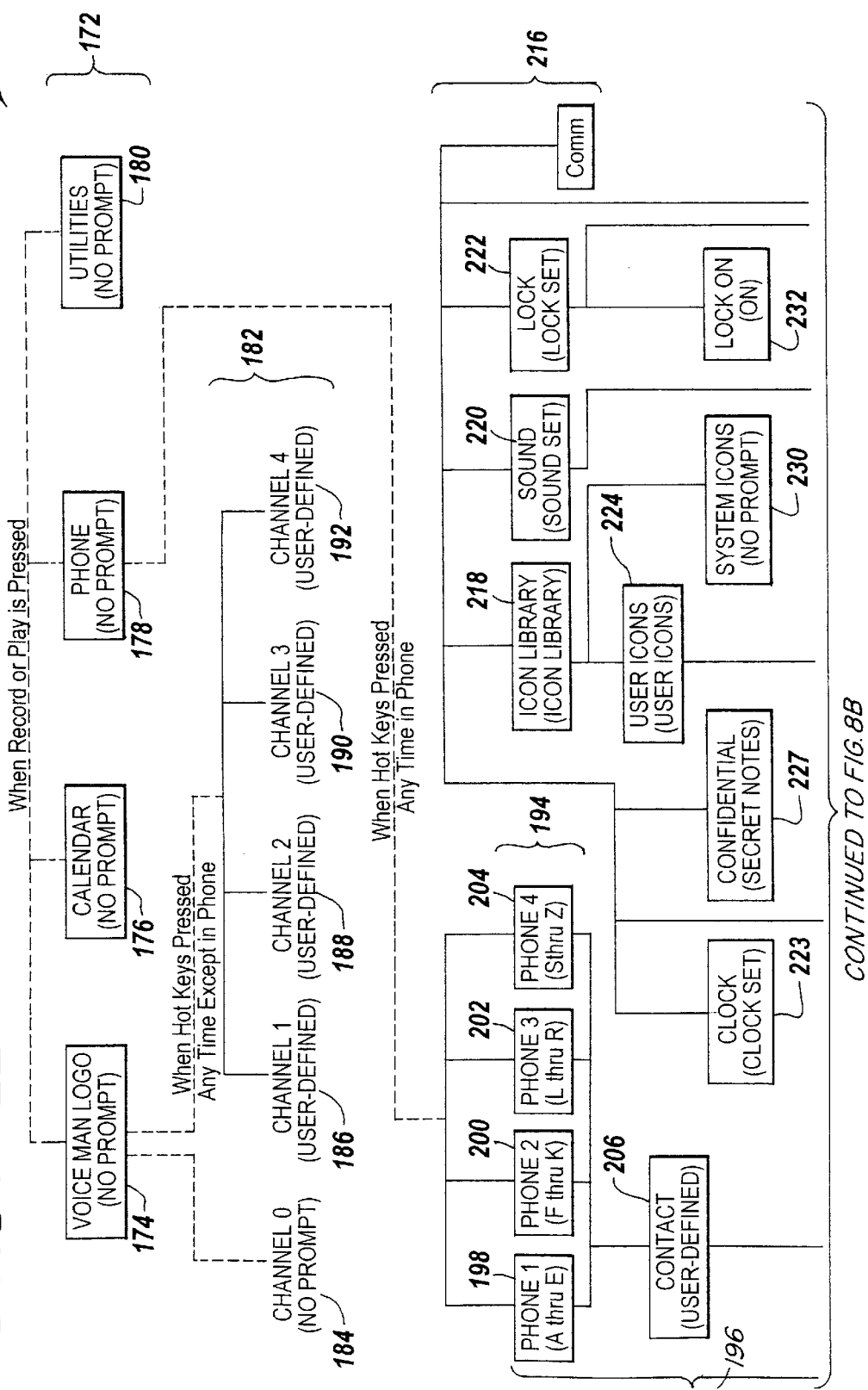
FIG. 8 is an illustration of a hierarchy of functions performed by a portable audio database device, and the graphical icons associated with each function which provides for an intuitive, icon-based method of navigating the function hierarchy.
Figure 8B:
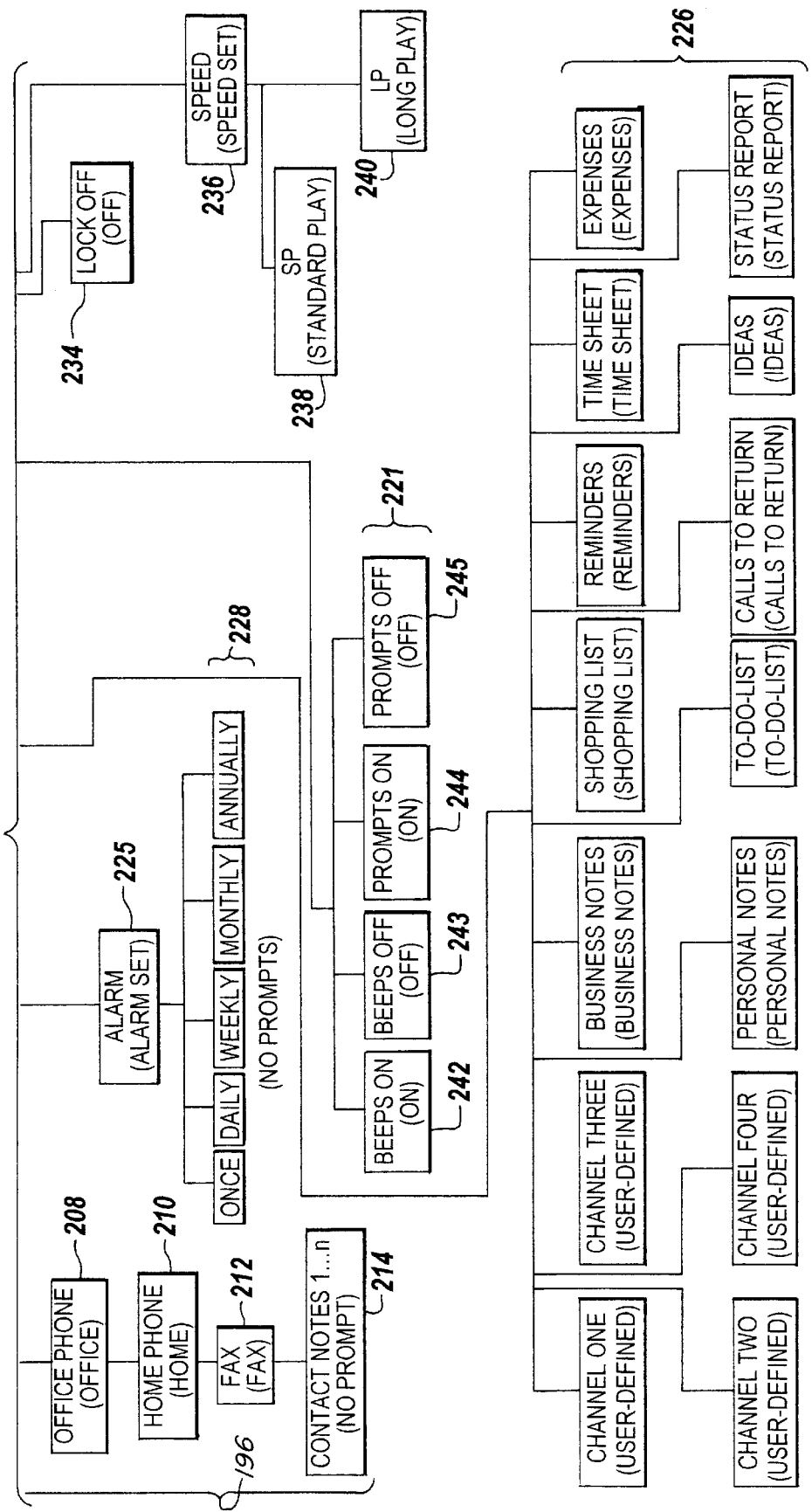

Referring now to FIG. 8, there is illustrated an icon-based hierarchical filing structure in accordance with one embodiment of the present invention. As is illustrated in FIG. 8, the system memory 122 is preferably configured to support an information filing structure that is hierarchical in form, with one or more category sub-levels being defined and accessible through associated primary category levels. Navigation of the hierarchical filing structure is advantageously enhanced by employment of graphical icons being associated with particular categories and functions to provide intuitive recognition of the nature of a particular category or function. Moreover, directional arrows 108, as best as seen in FIG. 3, visually indicate the relative direction of navigable branches in the hierarchical function tree shown in FIG. 8. Further, audio and/or verbal prompts may be employed to further enhance navigation of the icon-based hierarchical filing structure.

In accordance with the embodiment illustrated in FIG. 8, a first category level 172 of the filing structure hierarchy includes a number of functions and categories from which various lower level functions and categories can be accessed and executed. Associated with each of the first level categories is a respective icon which, when selected, is presented on the interface display panel 44. It is noted that a verbal prompt, if applicable, is denoted parenthetically below each of the icons indicated in FIG. 8. A Messages category 174 is considered a default category that is made available to a user upon initial start-up of the portable audio database device 40. Associated with the default Messages category 174 is a Message category icon, as is illustrated in the icon window 100 of the interface display panel 44 shown in FIG. 1. As will be discussed in greater detail hereinbelow, a user may skip through each of the categories selectable on the first category level 172, including a Calendar category 176, a Phone category 178, and a Utilities category 180. Associated with each of the Calendar, Phone, and Utilities categories 176, 178, and 180 is a corresponding icon which uniquely identifies each of these categories.

After selecting a category on the first category level 172, a user may then access any of the sub-categories defined thereunder. Selection of the default Messages category 174 provides access to a second category level 182 which allows a user to select among four user-defined message channels, including Channel-1 186, Channel-2 188, Channel-3 190, and Channel-4 192, each of which is associated with a user-defined verbal category label and, if desired, an associated user-defined icon. A default Message channel, indicated as Channel-0 184, is made available for storing audio messages in the event that none of the other message channels are selected. It is noted that Channel-0 184 is made available for storing audio messages upon initial start-up of the portable audio database device 40. As will be discussed in greater detail, audio messages or other audio information stored in a particular message channel may be easily transferred to any other message channel or other location in the hierarchical filing structure.

A user may select the Phone category 178 from the first category level 172, which provides access to a second phone category level 194. The second phone category level 194 includes four phone categories, including Phone-1 198, Phone-2 200, Phone-3 202, and Phone-4 204 categories. Each of these phone categories is preferably designated for storing phone numbers for persons having a particular range of last name initials. By way of example, the Phone-1 category 198 is preferably designated for storing the phone numbers and related information for contacts having a last name initial ranging between the letters A and E. In a similar manner, information for contacts having a last name initial ranging between the letters F and K are preferably stored in the Phone-2 category 200, while information for those having a last name initial ranging between the letters L and R are preferably stored in the Phone-3 category 202. Finally, the Phone-4 category 204 is preferably designated for contacts having a last name initial ranging between the letters S and Z.

Each of the four phone categories has associated with it a unique function icon and an associated verbal prompt indicating the range of last name initials applicable to the particular phone category. After a user selects a desired phone category from the second phone category level 194, a third phone category level 196 is made accessible and includes a Contact category 206, an Office Phone category 208, a Home Phone category 210, a Fax category 212, and a contact Notes category 214. As with each of the categories shown in FIG. 8, each of the categories defining the third phone category level 196 has associated with it a unique icon and, with the exception of the Contact Notes category 214, is associated with a unique category voice label.

A user, presented with the utilities icon indicative of a Utilities category 180, may access a robust set of utility tools as indicated by the utility functions accessible from the second utility category level 216. The Utilities category 180 provides access to many tools that allow the user to selectively configure the portable audio database device 40, including setting the time, setting alarms, using various calendar functions, changing, deleting, and adding icon categories and verbal category labels, turning prompts and beeps ON and OFF, enabling and disabling automatic lockout, changing recording speeds, selecting communication interface parameters, and configuring other operational parameters.

Figure 9:
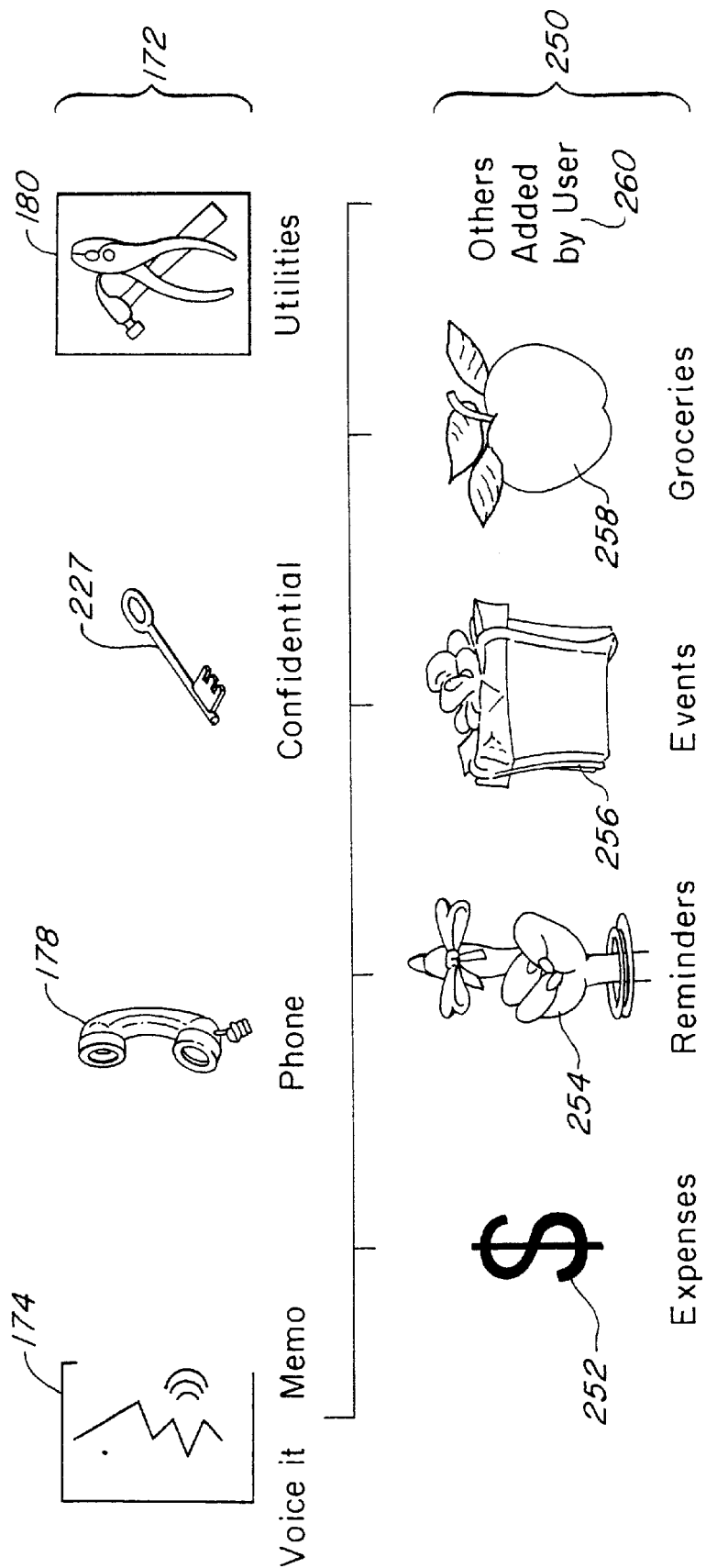
FIG. 9 illustrates function icons associated with a first function level in the function hierarchy, and several icons representing functions associated with a second function level.

In FIG. 9, there is provided an illustration of four categories and associated icons comprising the first category level 172 and a second messages category level 250 which is accessed through selection of the Messages category icon 174. In one embodiment, four pre-set message categories and associated icons are made available to the user, including an Expenses category 252, a Reminders category 254, an Events category 256, and a Groceries category 258. In addition to these four pre-set message categories, a user may define four additional message channels, shown as Channel-1 186, Channel-2 188, Channel-3 190, and Channel-4 192 in FIG. 8, and select appropriate icons for each of the four user-defined message channels. If desired, verbal category labels for each of the additional message channels may be created.

As is illustrated in FIG. 9, a user is presented with a graphical icon corresponding to a particular message category when navigating through the available pre-set and user-defined message categories comprising the second message category level 250. The Expenses category 252, for example, has associated with it a graphical dollar symbol icon which connotes the nature of this message category. Additionally, a verbal category label, such as "Expenses Category", may be created and subsequently broadcaster over the speaker 48 when the Expenses category 252 is accessed. The Expenses category 252 provides an area for tracking personal and business expenses, such as mileage, meals, tips, and other information, that is entered as verbal notes. The verbal notes are automatically time and date stamped. The procedure of time and date stamping verbal notes is particularly useful when querying and retrieving verbal notes, such as by reviewing such notes sorted in chronological order.

The Reminders category 254 has associated with it an icon well-understood as connoting the nature of this message category (i.e., an image of a string tied around a finger). When selected, the Reminders category 254 allows the user to record priority messages which may be key action items, priority lists, appointments or other messages that need special attention. As with any message stored in the portable audio database device 40, various alarms can be established so that a beep tone and the ability to automatically play a given message associated with the alarm will occur at a pre-programmed time established for the particular message.

The Events category 256 is denoted by a wrapped gift icon which indicates that the Events category 256 is designated for storing reminders of special events, such as birthdays, anniversaries, and the like. Such reminders may have associated alarms which may be selected as daily, weekly, monthly, or yearly. The Groceries category 258 is denoted by an apple icon which indicates that this category is provided for storing a list of grocery items. Although the four pre-set message categories are preferably provided upon initial use of the portable audio database device 40, a user may add or delete these or any other categories as desired. Additionally, a user may easily change or create category icons and verbal category labels as well.

Figure 10:
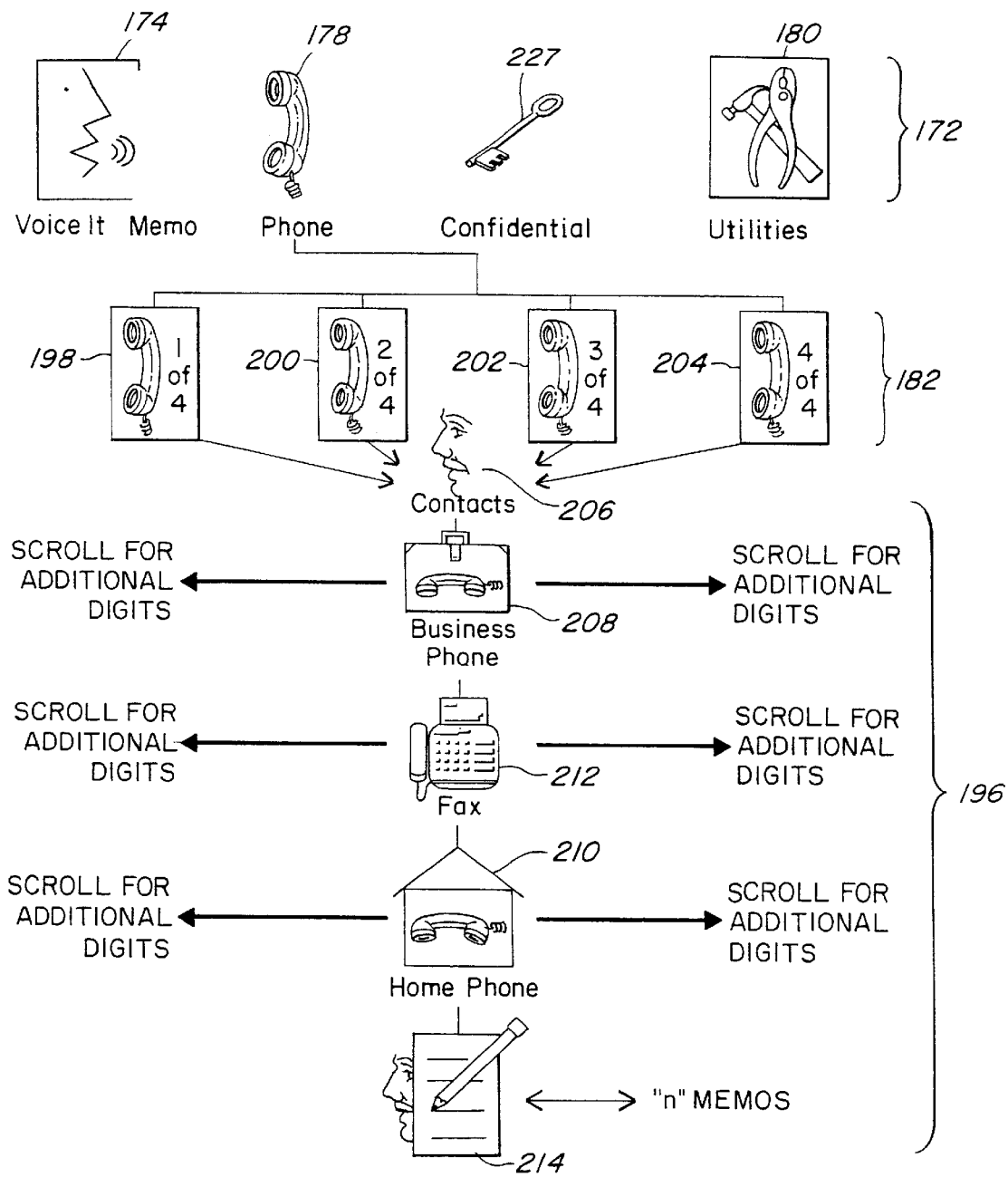
FIG. 10 illustrates various functions and corresponding icons associated with information contained in a phone category.

In FIG. 10, there is illustrated in greater detail the icons and functions available to the user by selecting the phone category 178 from the first category level 172. After navigating to, and selecting, the Phone category 178, the user may then skip through the four Phone categories 198, 200, 202, and 204 located on the second phone category level 182. Each of the phone categories has associated with it a phone icon identifying the phone category number relative to other phone categories. By way of example, selecting Phone category 200 results in displaying of the "2-of-4" Phone icon on the interface display panel 44, and, if desired, broadcasting of a verbal category label, such as "Contacts F through K". It is noted that the four phone message categories illustrated in FIG. 10 are preferably pre-defined categories, which may be modified, deleted, and added to by the user as desired.

After selecting a particular phone message category from the second phone category level 182, a number of icons and associated categories become selectable by the user. Initially, a Face Image icon 206 is presented on the interface display panel 44 and a verbal label indicating the contact's name is broadcaster over the speaker 48. It is noted that if the record button 68 is depressed while at this level, a new verbal label (i.e., new contact name) will be recorded for this contact. At this level, the user may scroll through all contacts having information stored under the selected phone category. After selecting a particular Contact 206, additional icons and functions become available for storing and retrieving contact-related information, including a Business Phone number 208, a Fax number 212, a Home Phone number 210, and one or more Memos 214. Once again, each of these categories, such as the Fax Number 212, has associated with it a unique icon that identifies the nature of the particular category. It is noted that the digits of a particular telephone number not presented on the interface display panel 44 may be accessed by scrolling in a left or right direction using the left or right navigation keys 64c and 64d, respectively.

Figure 11:
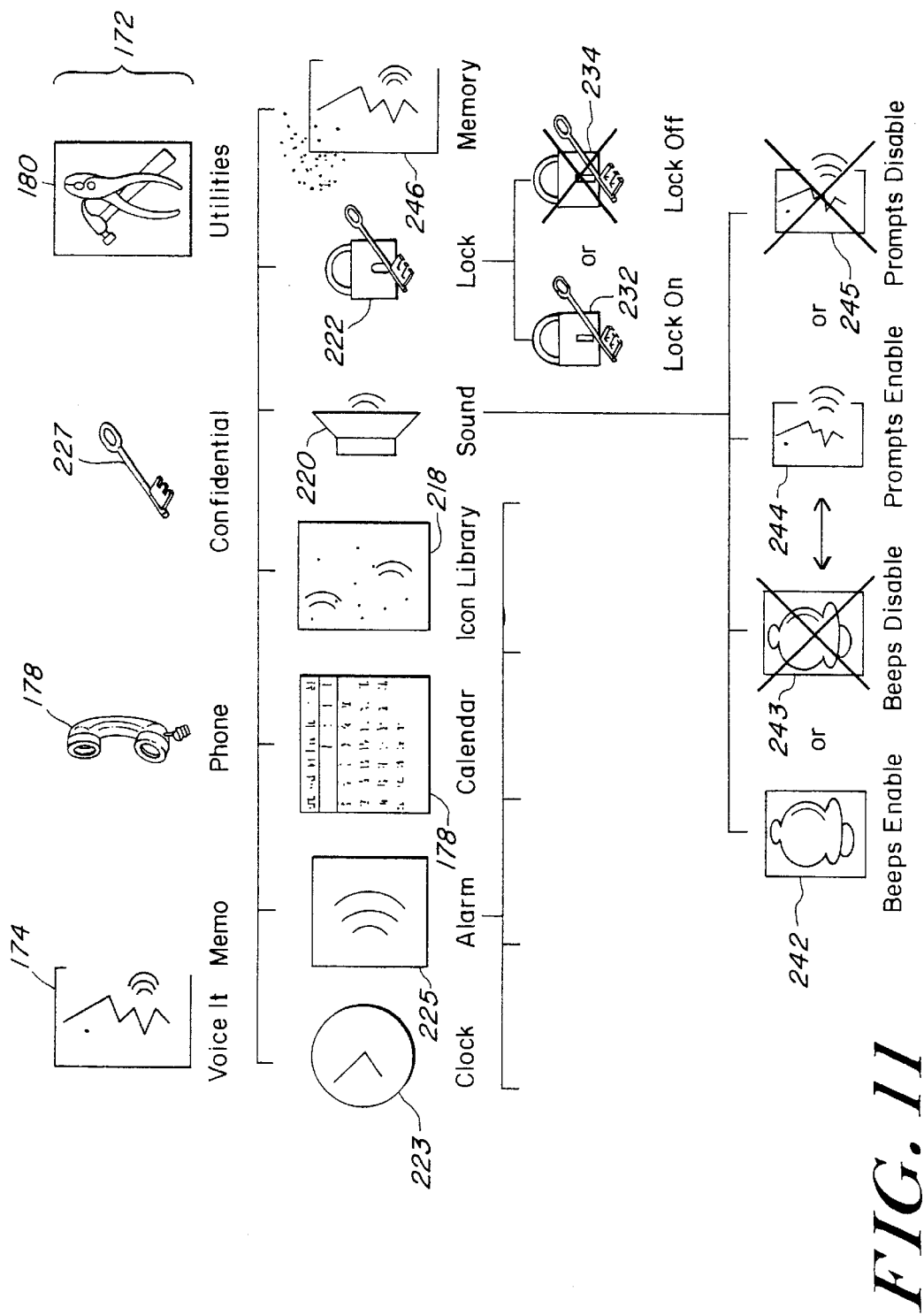
FIG. 11 is an illustration of various functions and corresponding icons associated with a utilities category.

In FIG. 11, the various tools that are made available by accessing the utilities category 180 from the first category level 172 are depicted by icons that represent each of the available tools. A user may scroll through the available utility icons and activate a desired utility function. Several of the functions available under the Utilities category 180 will be described hereinbelow in reference to FIGS. 13–20.

Figure 12:
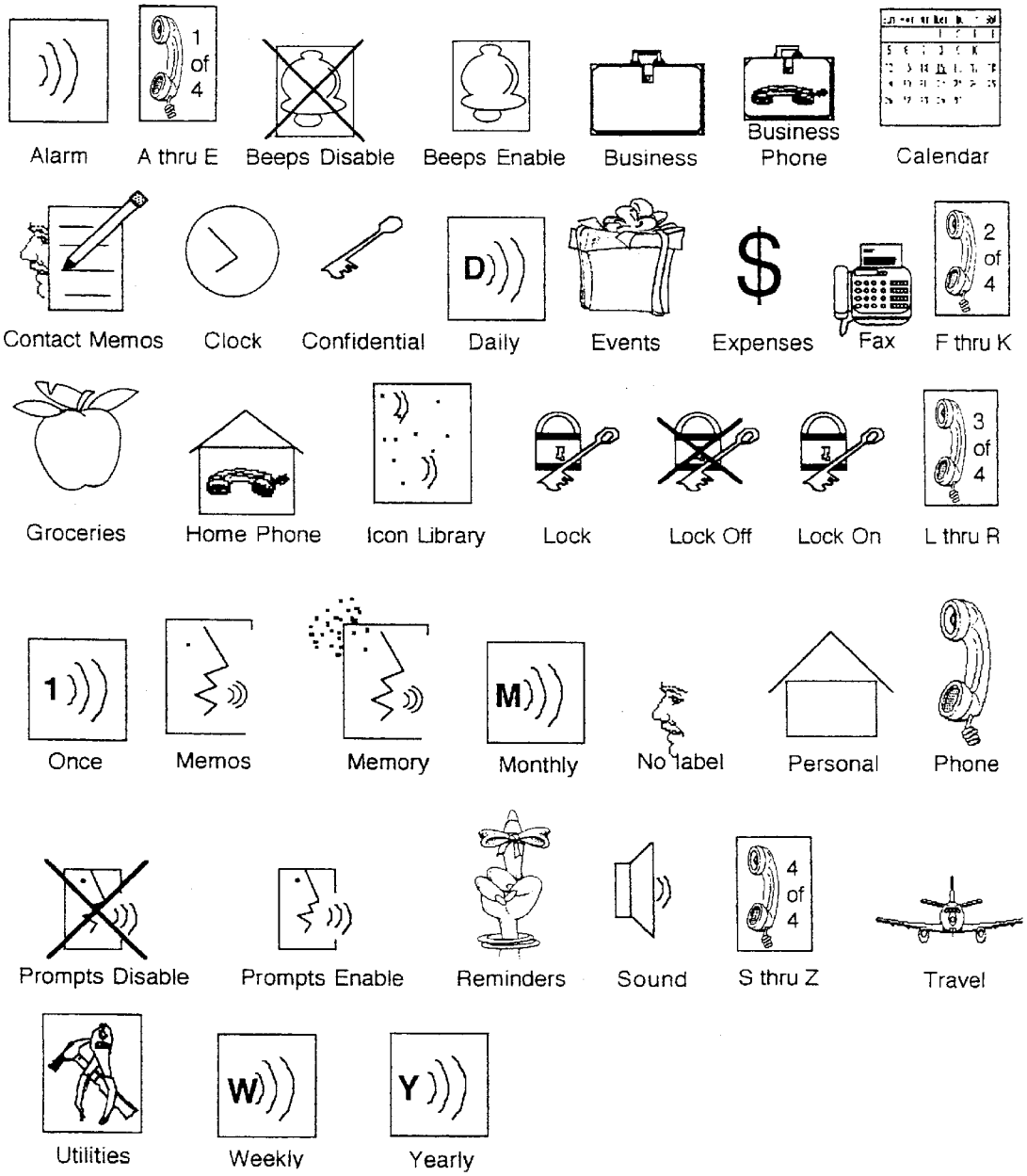
FIG. 12 is an illustration of various icons available in an icon library.

With reference being made to FIGS. 8, 11, and 12, a user may access an icon library category 218 through the utilities category 180. The icon library utility allows a user to add or modify icons associated with particular functions, categories, and messages or other information. FIG. 12 illustrates various icons that comprise the icon library 218. It is understood that additional icons may be loaded into the icon library 218 for subsequent access by the user. In practice, a copy of a particular icon selected from the icon library 218 may be manipulated by the user, with the original icon being permanently stored in system memory 122 in its original state. A typical alteration to a selected icon which is assigned to a particular function involves recording or modifying the verbal label or prompt that is associated with the selected icon. Other alterations to a particular icon involve modifying the graphical representation of the icon, which results in an alteration of the bit-map pattern of the selected icon.

In FIGS. 13–20, there is illustrated various presentations on the interface display panel 44 which will provide a further appreciation of the intuitive operating and navigating capabilities of the portable audio database device 40. After the initial installation of batteries into the housing 41 of the portable audio database device 40, a default presentation will be displayed on the interface display panel 44, such as that shown in FIG. 13A. As was discussed previously, the default Message category icon 174 is presented in the icon window 100 indicating the availability of the previously described message recording, editing, and retrieving functions. FIGS. 13B–13D illustrate interface display panel presentations associated with setting the time and date of the portable audio database device 40, which is initiated by accessing the Utilities category 180.

Figure 13A:
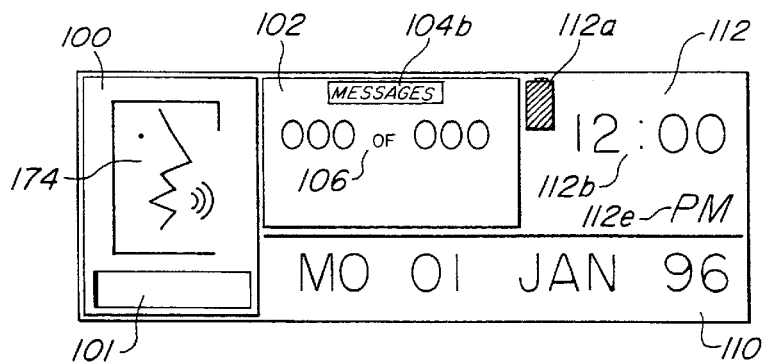
FIGS. 13–20 illustrate various display presentations provided by an icon-based graphical user-interface, with various functions performed by a user of the portable audio database device being shown.
Figure 13B:
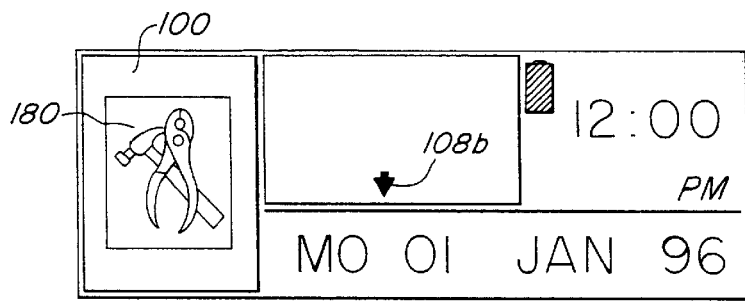
Figure 13C:
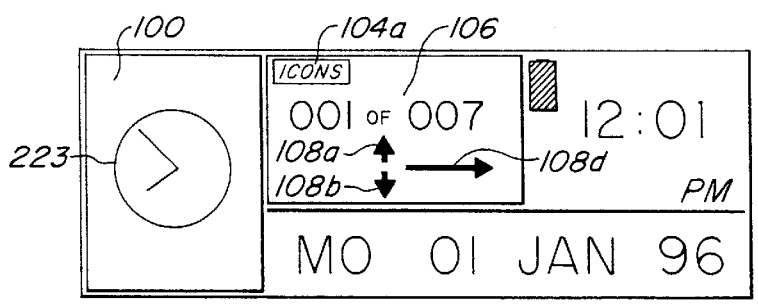

With reference to FIG. 13B, a user presses the option button 72 of the command panel 42 a number of times until the Utilities category icon 180 is presented in the icon window 100. The Down direction indicator 108b presented in the category information window 102 indicates to the user that additional functions and associated icons can be accessed by depressing the Down key 64b of the command panel 42. It is noted that a user may access the utilities category 180 by depressing the Down key 64b or, alternatively, by depressing the select/enter button 70 when the utilities icon is presented in the icon window 100.

Figure 13D:
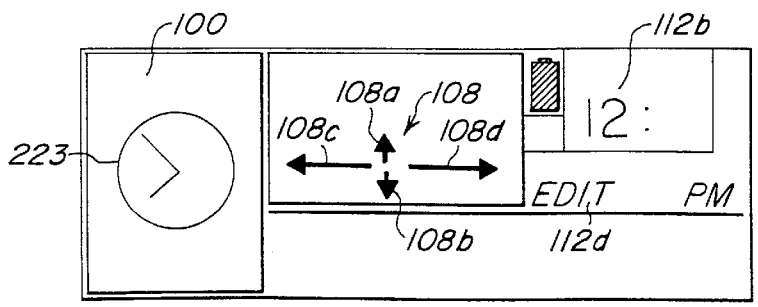

The Clock icon 223 is the first of several utility icons which may be accessed at the second utility category level 216. It is noted that icon category indicator 104a and the available navigation direction indicators 108a, 108b, and 108d are presented in the category information window 102. Additionally, the number indicator 106 indicates to the user that the Clock icon 223 represents the first of seven icons made available at the second utility category level 216. A user may enter the clock utility by pressing the Down key 64b of the command panel 42 or the select/enter button 70. The user then depresses the edit button 74 until the edit mode indicator 112d is presented in the operating information window 112. As is indicated in FIG. 13D, all four direction indicators 108 are displayed in the category information window 102 indicating that all four navigation keys 64 are available for actuation.

Using the Up key 64a and Down key 64b, the user may select the appropriate hour, and then press the Right key 64d when the proper hour is displayed. This will result in the transitioning of the hour parameter from a blinking state to a non-blinking state, and the transitioning of the next time parameter to be programmed to a blinking state. The user repeats this process for each of the time and date parameters displayed in the operating information window 112. It is noted that a 24-hour time format can be activated by double-clicking the Up key 64a when setting the hour time parameter. Double-clicking the Up key 64a once again returns the time format to an AM/PM time format. Left and Right keys 64c and 64d may be depressed to scroll through each of the time and date parameters for purposes of modifying or correcting an entry. When completing the entry or editing session, the select/enter button 70 is pressed, and the time and/or date changes are made effective. It is noted that pressing the select/enter button 70 during the programming session will save any previously entered or modified data. Pressing the edit button 74 at any time exits the programming session without saving any changes.

Turning to FIG. 14, there is illustrated various interface display panel presentations associated with a number of the tools available in the utilities category 180. FIG. 14A, for example, indicates that the sound utility has been selected, as indicated by the Sound icon 220 presented in the icon window 100. The number indicator 106 indicates that the sound utility 220 is the fifth of seven available utilities provided at the second utility category level 216. The user may execute the sound utility 220 by pressing the Down key 64b or the select/enter key 70 which, in turn, permits the user to access several sound utility tools, as is indicated by the functions accessible on the second sound category level 221 shown in FIG. 8. One such function, as illustrated in FIG. 14B, provides the ability to toggle the Beeps-On function between an enabled and disabled state as indicated by the Beeps-On icon 242 and Beeps-Off icon 243 presented in the icon window 100, respectively.

Figure 14A:
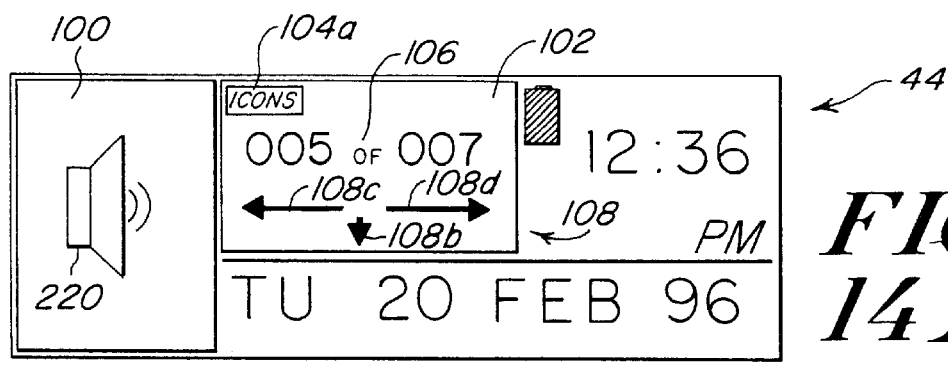
Figure 14B:
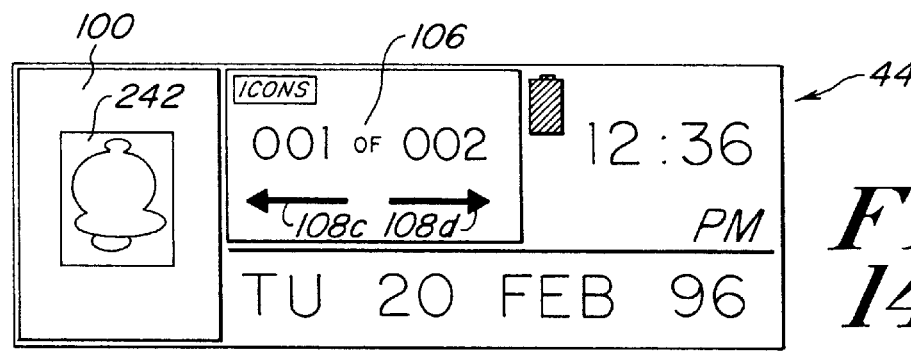
Figure 14C:
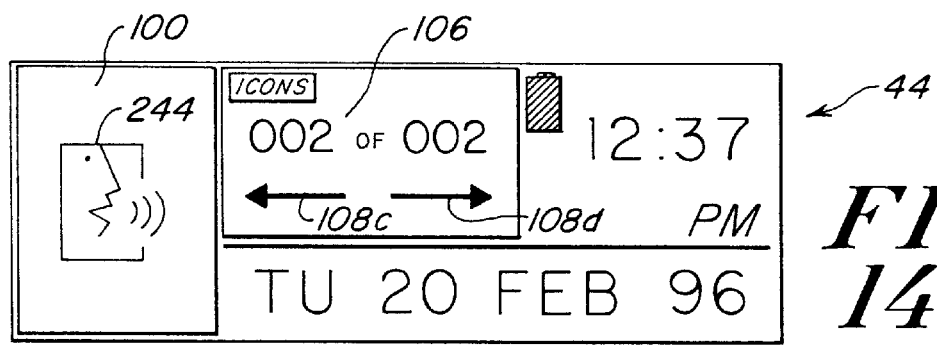
Figure 14D:
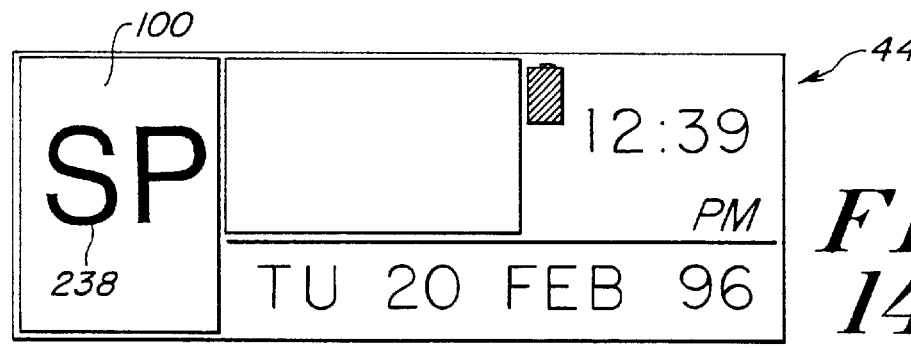

The user may access the Prompts-On 244 and Prompts-Off 245 functions in a similar manner to respectively turn on and turn off the verbal labels and/or categories prompts. It is noted that the Edit key 74 may be pressed to toggle the Beeps and Prompts icons and functions between enabled and disabled states. FIG. 14C illustrates the Prompts icon 244 in an enabled or on state. FIG. 14D illustrates user selection of a speed utility 236 which may be used to change the recording mode and quality between a standard play (SP) mode 238 and a long play (LP) mode 240. The SP icon 238 presented in the icon window 100 indicates the current state of the speed function being set at the standard play mode 238. The long play mode 240 may be selected using the Edit key 74.

Figure 15A:
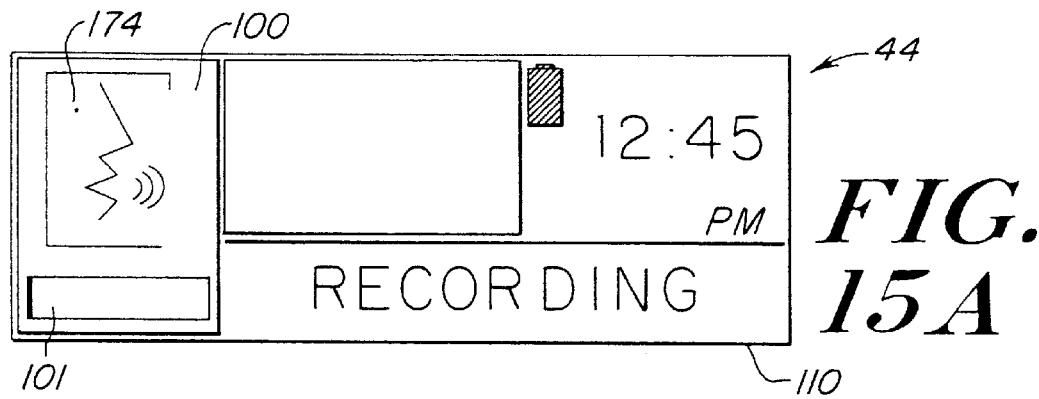
Figure 15B:
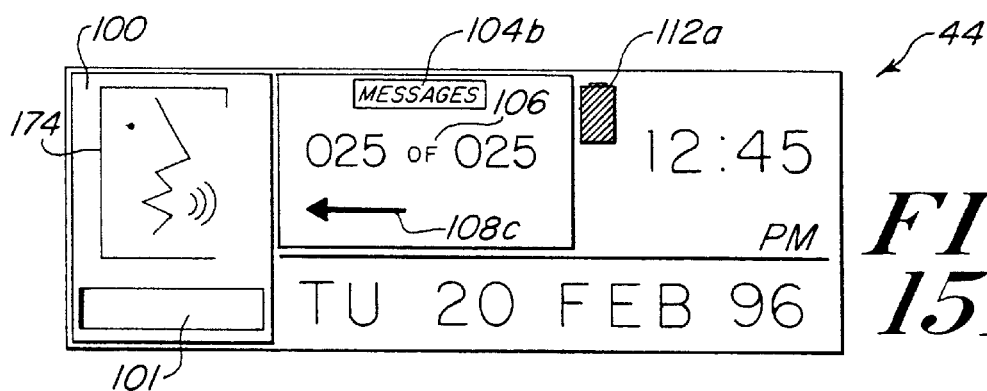

Various recording functions are illustrated in FIG. 15. It is noted that pressing the record key 68 at anytime while operating in the first category level 172 will result in immediate initiation of a recording session, with the recorded information being stored in the default message category associated with the message category icon 174. As such, the "RECORDING" prompt presented in the alpha-numeric information window 110 indicates that the current message or note will be stored in the category location identified by the icon presented in the icon window 100, which in this case is the default message category 174. After recording a message or a note, or when the message category 174 is accessed by use of the navigation control pad 64, the user is presented with various types of information on the interface display panel 44, including the Message category icon 174, the memory status indicator 101, the time and date, the current message number and total number of messages 106, the Battery Status indicator 112a, and the available navigation directions as indicated by the direction indicator 108.

Figure 15C:
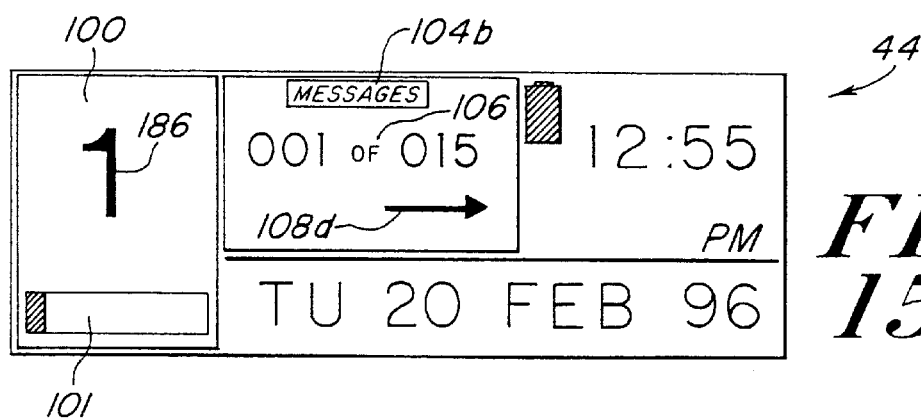

A user may press any of the four category channel keys 52, 54, 56, and 58 to immediately access a desired user-defined category channel. As is illustrated in FIG. 15c, for example, a user may immediately access the Channel-1 186 category by pressing the channel-1 key 52. The Channel "1" icon 186 is presented in the icon window 100, and the current and total number of messages stored in the channel-1 category 186 is indicated by the number indicator 106. A user may skip through each of the messages or skip within any particular message as indicated by the direction indicator 108. If the user desires to change the current voice prompt associated with the Channel-1 icon 186, the record button 68 is pressed and held, thus allowing the user to record a new voice prompt. It is noted that if an icon prompt does not have associated with it a verbal prompt, an error signal, such as a flashing red LED 62 or broadcasted error message, will be communicated to the user.

It is further noted that pressing the record key 68 while viewing a phone number will transfer the destination category of the recording from the current category to the Contact Notes category 214, thus recording a new message in the Contact Notes category 214 for the particular contact. In one embodiment, pressing the record key 68 while in the Phone category 178 or one of the four phone sub-categories 198, 200, 202, and 204 will cause a recording to be made in the default Message category 174.

Pressing the select/enter key 70 while recording will initiate a pause operation. If a time-out period of approximately five minutes is exceeded before the record key 68 is again pressed so as to resume the recording operation, the default Message category 174 will be accessed. It is noted that if the system lock mode 222 is enabled, the system will enter the lock mode, as indicated by a Lock-On icon 232, which will require the input of an appropriate password by the user in order to continue the operating session. The portion of the recording stored before initiating a pause will be recorded as a separate message in the default Message category 174.

While located at any category where messages or notes can be recorded, a user may press the play key 66 to immediately initiate playing of the first message in the current category. The play key 66 is pressed and then released to being playing a message. Concurrently, information regarding the messages for the selected category and the navigation directions available to the user are displayed in the category information window 102. The time/date stamp information associated with each of the messages will appear and slowly blink to indicate when the particular message was created. A green LED 60 proximate the play key 66 is illuminated during the play operation. The entire message within the current category will play to completion and then stop at the beginning of the next message. If the user attempts to initiate the play operation while navigating in a category within which recordings are not permitted, the red LED 62 will blink and an error tone/prompt will be sounded.

The play operation is typically initiated at the beginning of the next message after having listened to a previous message partially or completely. If a message is only partially listened to by the user, such as by pressing the play key 66 during playback, the playback operation will be initiated at the beginning of that particular message. The play operation can be paused by pressing the select/enter key 70 or the play key 66 during play, and can be resumed by once again pressing the select/enter key 70 or the play key 66. If a pause operation is left unattended for more than five minutes, the pause operation will discontinue and operation will transition to the default Messages category 174. The green LED 60 adjacent to the play key 66 blinks while operating in a pause mode.

If the play key 66 is pressed and held for about one second, continuous playing of all messages in the current category occurs, with a short pause occurring between messages. If the Right key 64d or left key 64c is pressed while a message is playing, the next or previous message, respectively, will be immediately played from the beginning and stop at the completion of the message. In continuous play mode, skipping to a next or previous message is accomplished in the same way, whereby play will stop after the successive message is listened to.

Figure 16A:
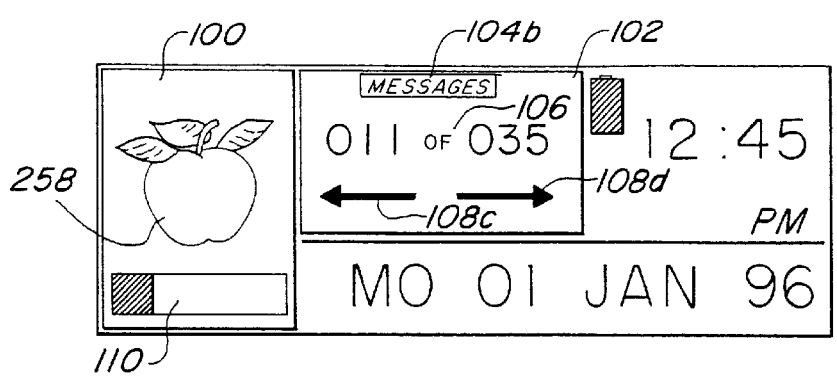
Figure 16B:
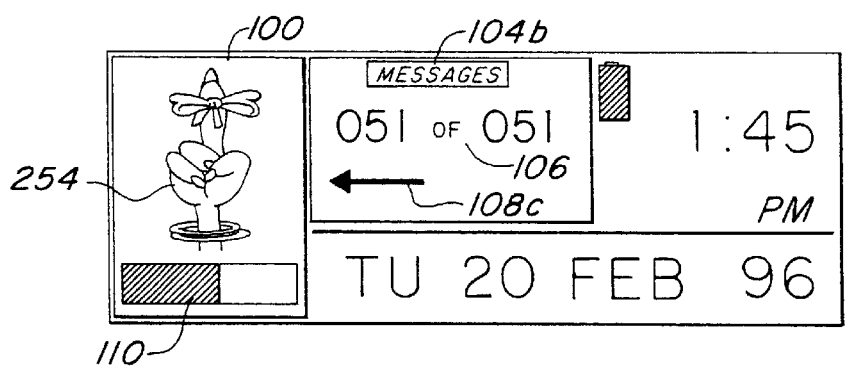

While viewing a phone number displayed in the alpha-numeric information window 110, the user may press the play key 66 to initiate the generation of dial tones that are broadcaster over the speaker 48 after an approximate two-second delay. In the illustration of FIG. 16a, the interface display panel 44 indicates that the eleventh of thirty-five messages filed under the Groceries category 258 is currently available for playback or alteration. The time and date stamp information presented on the interface control panel 44 slowly blinks to indicate when the eleventh message was created.

Figure 16C:
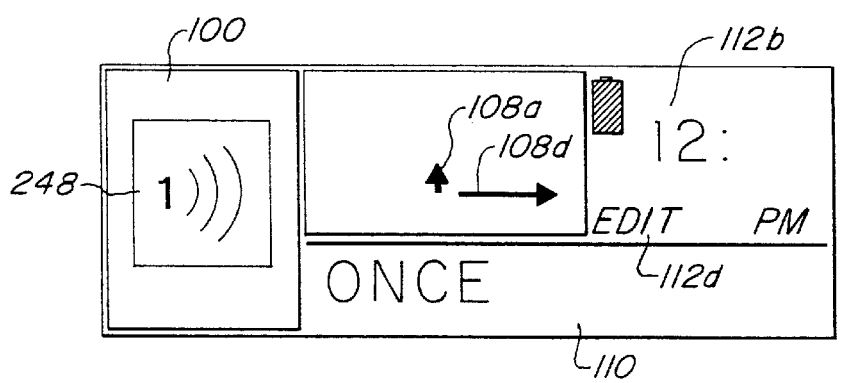

An important feature of the portable audio database device 40 concerns the ability to set alarms for various types of messages associated with particular information categories. In the illustration provided in FIG. 16b, a user may wish to establish an alarm associated with the fifty-first message filed in the Reminders category 254. In this example, a user may have previously recorded this fifty-first message, or, alternatively, have just completed recording of this message. Assuming that no alarm has been previously set for the fifty-first message, the First Alarm icon 248, shown in FIG. 16c, is presented in the icon window 100 upon pressing the alarm key 78. If an alarm had been previously established for the fifty-first message, the information regarding the previously established alarm would have appeared in the interface display panel 44 for approximately two seconds. A user may navigate to the right as indicated by the right direction indicator 108d to select between various kinds of alarms.

Figure 16D:
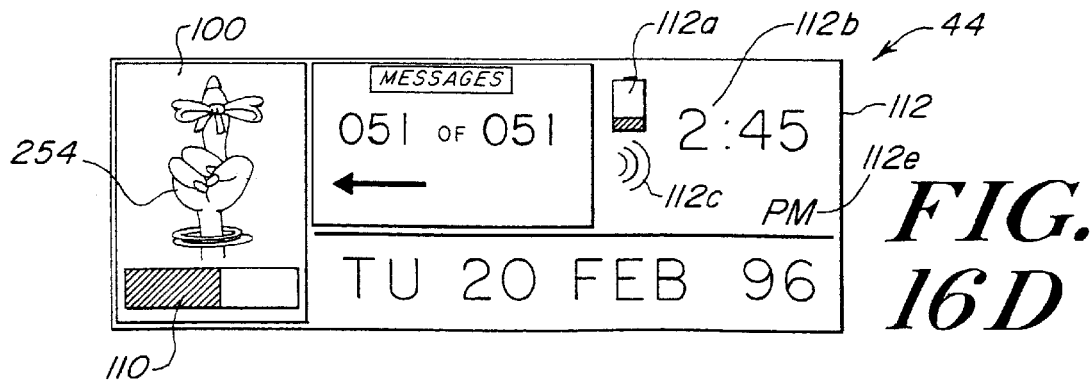

After the desired type of alarm has been reached, a user may press and hold the edit key 74 to begin the time and date setting operation for the alarm. The user establishes the alarm time and alarm date in the same manner as discussed previously with respect to setting the system time and date. Pressing the select/enter key 70 saves the alarm settings or, if desired, pressing the edit key 74 undoes all changes and exits to the Alarm Set icon 248. As illustrated in FIG. 16d, an alarm for the fifty-first message is shown as having been set as indicated by the Alarm Icon 112c presented in the operating information window 112. In order to check the status of previously established alarms, the user navigates to a particular message and presses and releases the alarm button 78. The date and time established for a particular alarm will flash for approximately two seconds. The type of alarm will also be indicated during the check alarm period. If there is no alarm for the current location, operation will be transitioned to the alarm set category as discussed previously with respect to FIG. 16c. After the two-second check alarm period has expired, the normal presentation of message information and current time and date will be presented on the interface display panel 44.

Enabling and disabling alarms may be accomplished by accessing a desired message, and holding the alarm key 78 until the Alarm Icon 112c appears or disappears. If an alarm is currently sounding, the alarm may be turned OFF by pressing and holding the alarm button 78. When an alarm sounds, a beep is broadcast over the speaker 48 every second for approximately five minutes, after which a chirp is broadcaster every ten seconds thereafter. Also, the Alarm Icon 112c will flash until the alarm or alarms have been listened to by the user. The alarm cycle will continue until the play button 66 is pressed or the alarm is turned OFF by pressing and holding the alarm button 78. The message associated with an alarm must be listened to entirely or partially in order for the alarm to be removed from the calendar. If one or more alarms have occurred during a sleep mode of operation, the portable audio database device 40 will sound a chirp every ten seconds and the Alarm Icon 112c will be flashing.

Figure 17A:
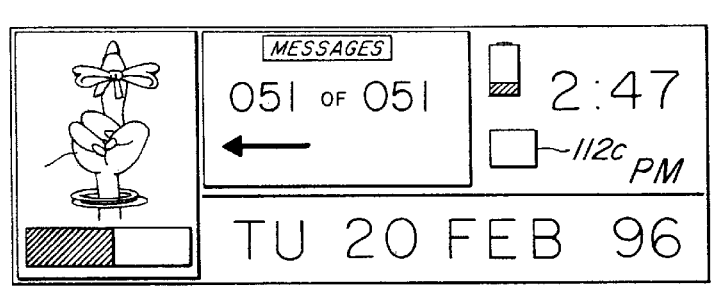
Figure 17B:
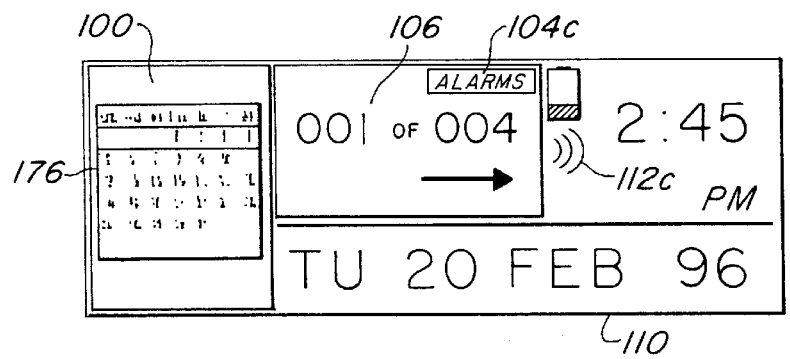

As is illustrated in FIG. 17b, a user may access the Calendar category 176 for purposes of reviewing pre-established alarms and alarms which have sounded. The user presses the option button 72 until the Calendar category 176 is accessed. The user then presses the alarm button 78 to access the alarms which have sounded. It is noted that the Alarm Icon 112c will flash until all of the messages associated with the alarms which have sounded have been listened to by the user. To exit the alarm listening mode prior to listening to the messages of all sounded alarms, the user may again press the alarm button 78. The user may also cancel sounded alarms by listening to the messages associated with each alarm accessed through the respective alarm categories or by using the Calendar category function 176. In either case, the criteria that must be met in order to remove an alarm message from the Calendar 176 is to listen to part or all of the message or messages associated with the alarm.

An alarm may be edited by first navigating to the message associated with the alarm. The user then presses and releases the alarm button 78. The user then presses and releases the edit button 74 and follows the same procedure described hereinabove. It is noted that a user may quickly cycle through items not currently of interest by successively pressing the Right key 46d. Changes that are made during the alarm editing process may be saved by pressing the select/enter button 74 or discarded by pressing and releasing the edit button 74.

Figure 17C:
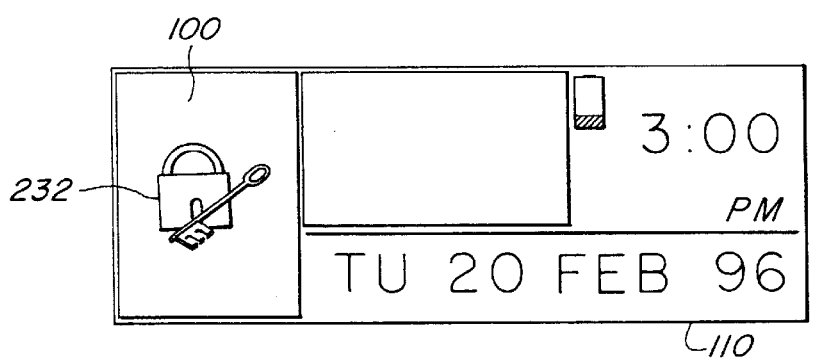
Figure 17D:
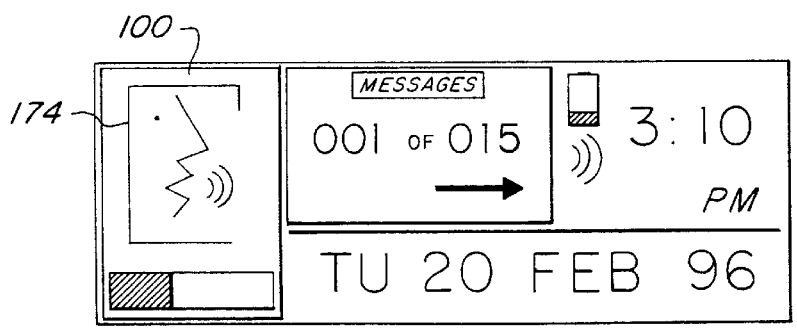

FIG. 17c illustrates a functional mode by which all or selected information categories can be password protected and accessed only by inputting an appropriate password. FIG. 17c illustrates the portable audio database device 40 in a standby locked mode, with the Locked icon 232 being presented in the icon window 100. A user may press any key to "wake-up" the device 40 which results in an "enter code" message appearing in the alphanumeric information window 110. After entering an appropriate password, which may include up to eight-characters, the device 40 is unlocked and ready for immediate utilization. As indicated in FIG. 17d, entry of an appropriate password results in the portable audio database device 40 transitioning to the default Message category 174.

Figure 18A:
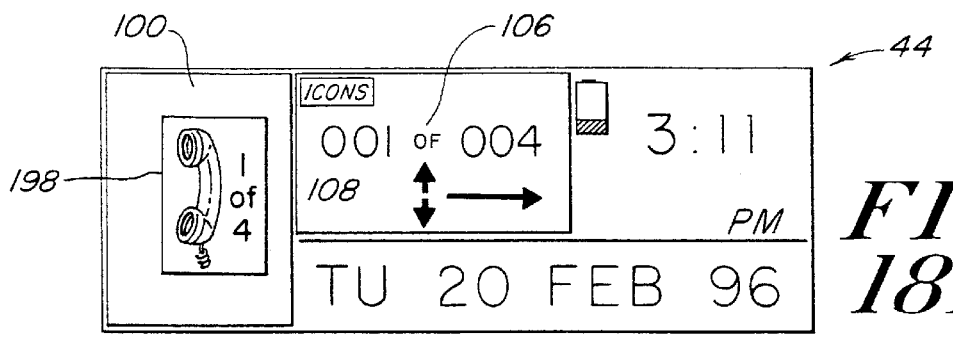

An important feature of the portable audio database device 40 concerns the categories and functions made available to the user under the phone category 178. A user accesses one of the four pre-set phone categories by pressing the operation button 72 and navigating to the desired phone category. As shown in FIG. 18a, the Phone category-1 198 is the first of four such phone categories as indicated by the icon number indicator 106. Other phone categories can be accessed by pressing the available navigation keys 64 as indicated by the direction indicators 108. In order to enter information into the Phone-1 category 198, for example, the user presses the edit button 74 which results in flashing of the Phone category-1 icon 198 in the icon window 100. Pressing the Down key 64b at this time provides access to the Contacts category 206, which is initially empty as indicated by the "RECORD NAME" message presented in the alphanumeric information window 110.

It is noted that a user may replace a previously recorded verbal prompt at this time by pressing the record button 68 instead of the Down key 64b. In order to record the name of the contact as a verbal label for the Phone category-1 198, the user presses and holds the record button 68, utters the contact's name, and then releases the record button 68. The recorded name is broadcasted over the speaker to verify the desirability of the input. If the user wishes to re-record the contact's name, the recording process is repeated. It is noted that the red LED 62 is illuminated and the label "RECORD NAME" is displayed in the alphanumeric window 110 during the recording operation. The play button 66 may also be pressed at any time to broadcast the current version of the contact's name or label. Pressing the Up key 64a at this time cancels further entry and exits the edit mode.

Figure 18B:
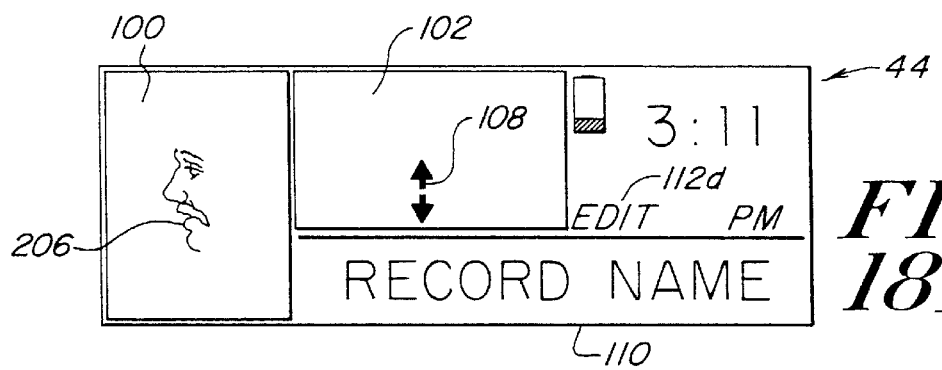
Figure 18C:
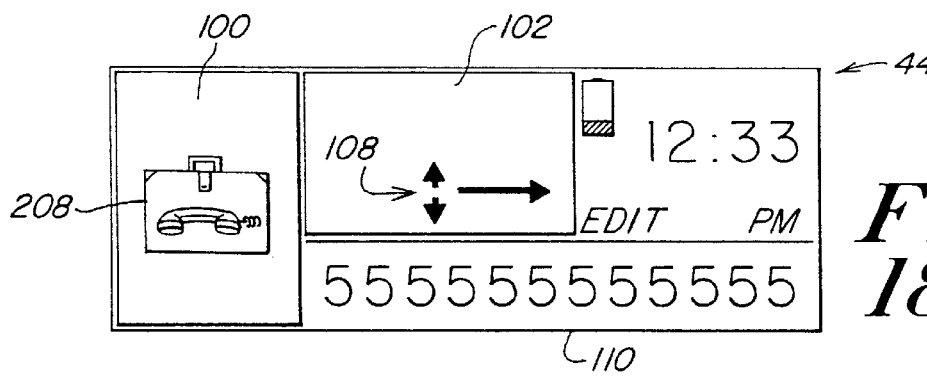

Upon reaching the Contact icon level 206 as shown in FIG. 18b, a user may depress the Down key 64b to reach the Office phone category 208 as shown in FIG. 18c. A preset voice prompt, such as "business phone category", may be broadcaster when entering the Office phone category 208. Initially, a row of twelve digits, such as twelve numeral "5" characters, are initially displayed in the alphanumeric information window 110, with the first character being in a blinking state indicating that the user may alter the first digit of the business phone number. The direction indicators 108 presented in the category information window 102 indicate that the user may increment or decrement a particular blinking character by pressing the Up key 64a and Down key 64b, respectively. The Right key 64d may be pressed in order to program the next digit of the phone number. The user may then move left or right within the row of telephone number characters to appropriately program each of the characters. Pressing the select/enter button 70 saves the final number, and provides access to the next phone number to be programmed, such as a fax number 212 as indicated in FIG. 18d.

Figure 18D:
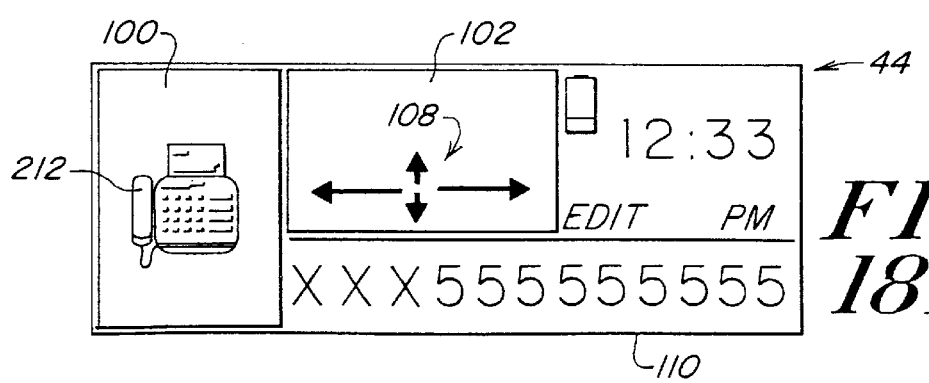
Figure 19A:
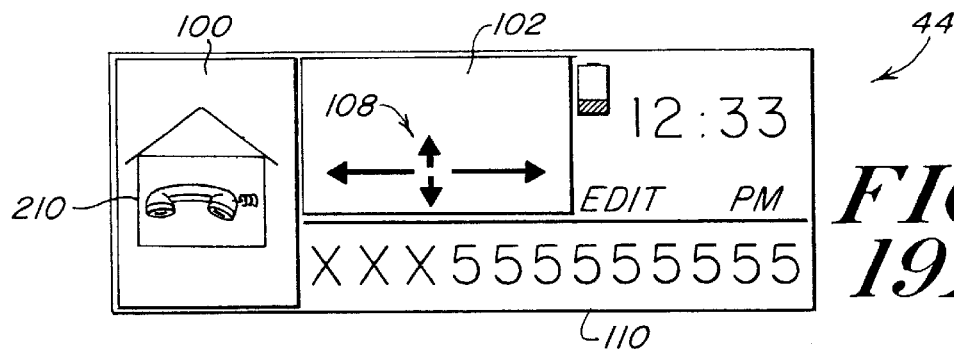
Figure 19B:
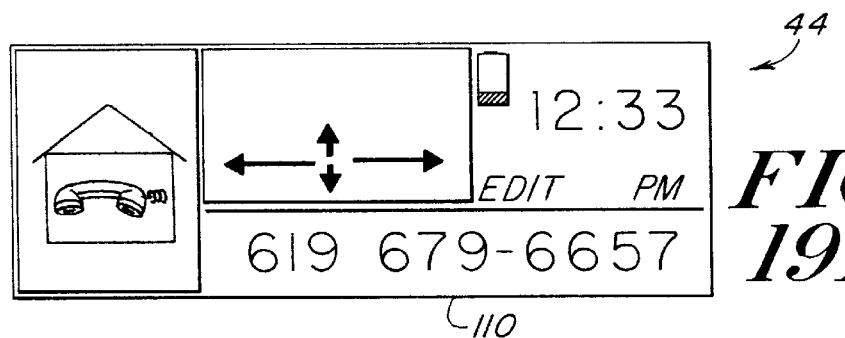
Figure 20A:
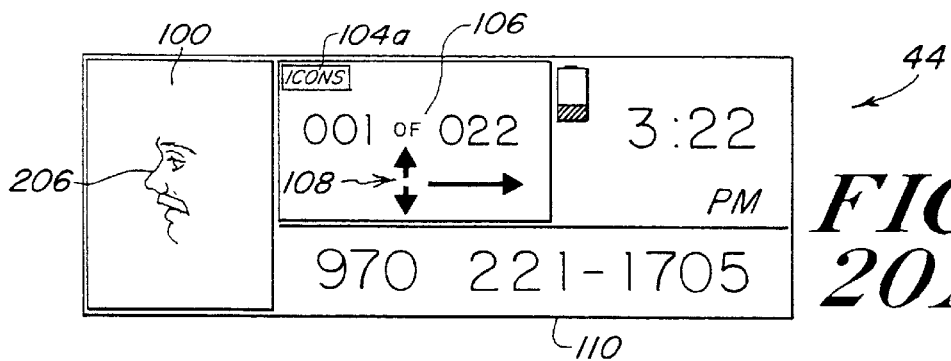
Figure 20B:
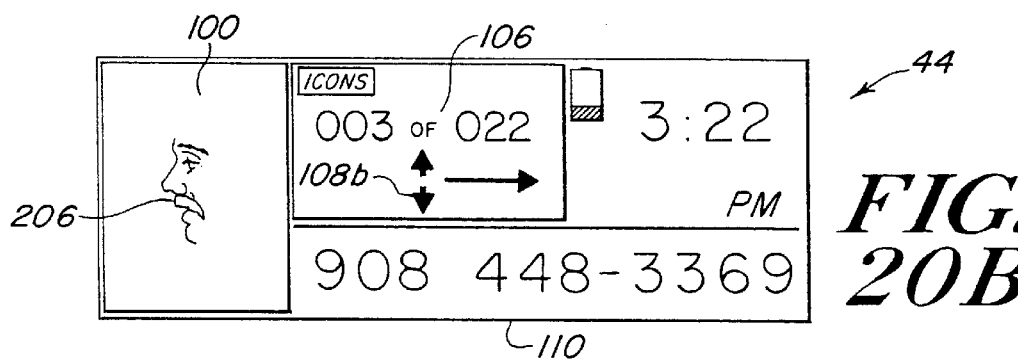

As is shown in FIGS. 18d, 20a, and 19b, a user may program other phone numbers associated with a particular contact in the same manner, such as a fax phone number and a home phone number. It is noted that, while in the phone edit mode, pressing the select/enter button 70 results in saving the current phone number and scrolling to the next phone number. In this way, phone numbers of varying types can be edited efficiently. It is further noted that pressing the edit button 76 at any time during this procedure results in exiting the phone edit mode without any changes being saved.

Figure 19C:
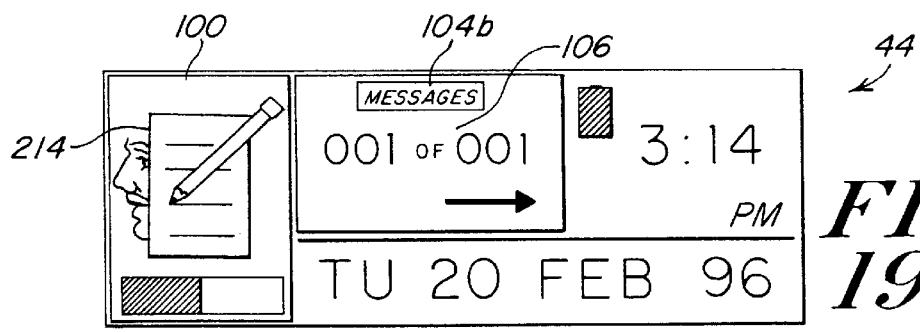

A particularly useful feature available through the Phone category 178 concerns the capability to record one or more notes concerning a particular contact. As is indicated in FIG. 19c, after a contact 206 has been selected, a user presses the Down key 64b in order to enter the contact's Note category 214. In order to record a message for this contact, the user presses and releases the record button 68, records a message, such as an address or directions to the location of the contact's home or office, and then presses the record button 68 once again to save the message. In order to record multiple messages, the user simply presses and releases the record button 68 and repeats the above-described recording process for each message. In this way, several memos or messages relating to a particular person may be recorded and later retrieved by accessing the particular phone record. When a message or note is recorded in the contact Note category 214, a time/date stamp is created, which will be presented in the time display area 112b of the interface display panel 44. It is noted that pressing the record button 68 at any time while the user is in the contact category 206 provides for immediate recording of a note or message into the contact's Note category 214.

Figure 20C:
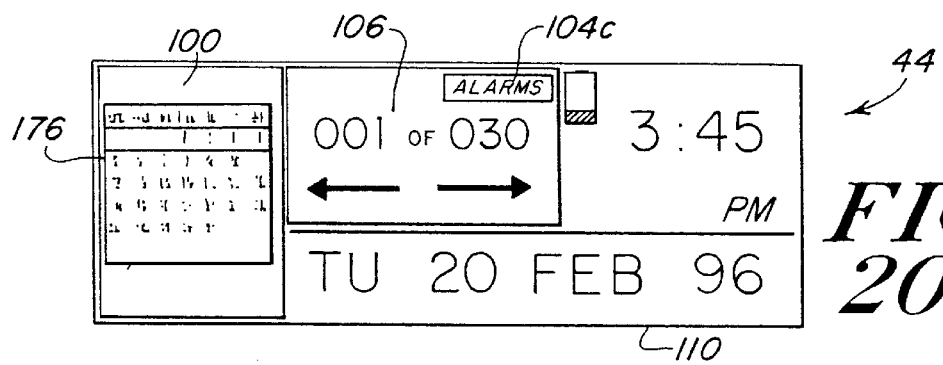
Figure 20D:
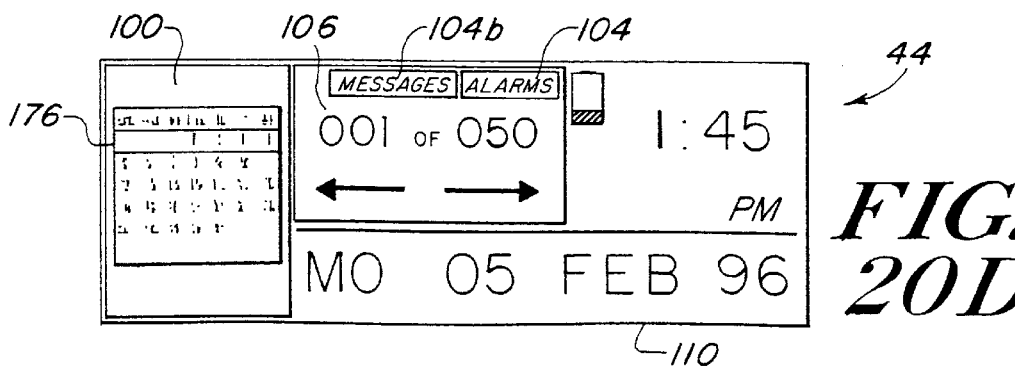
Figure 21:
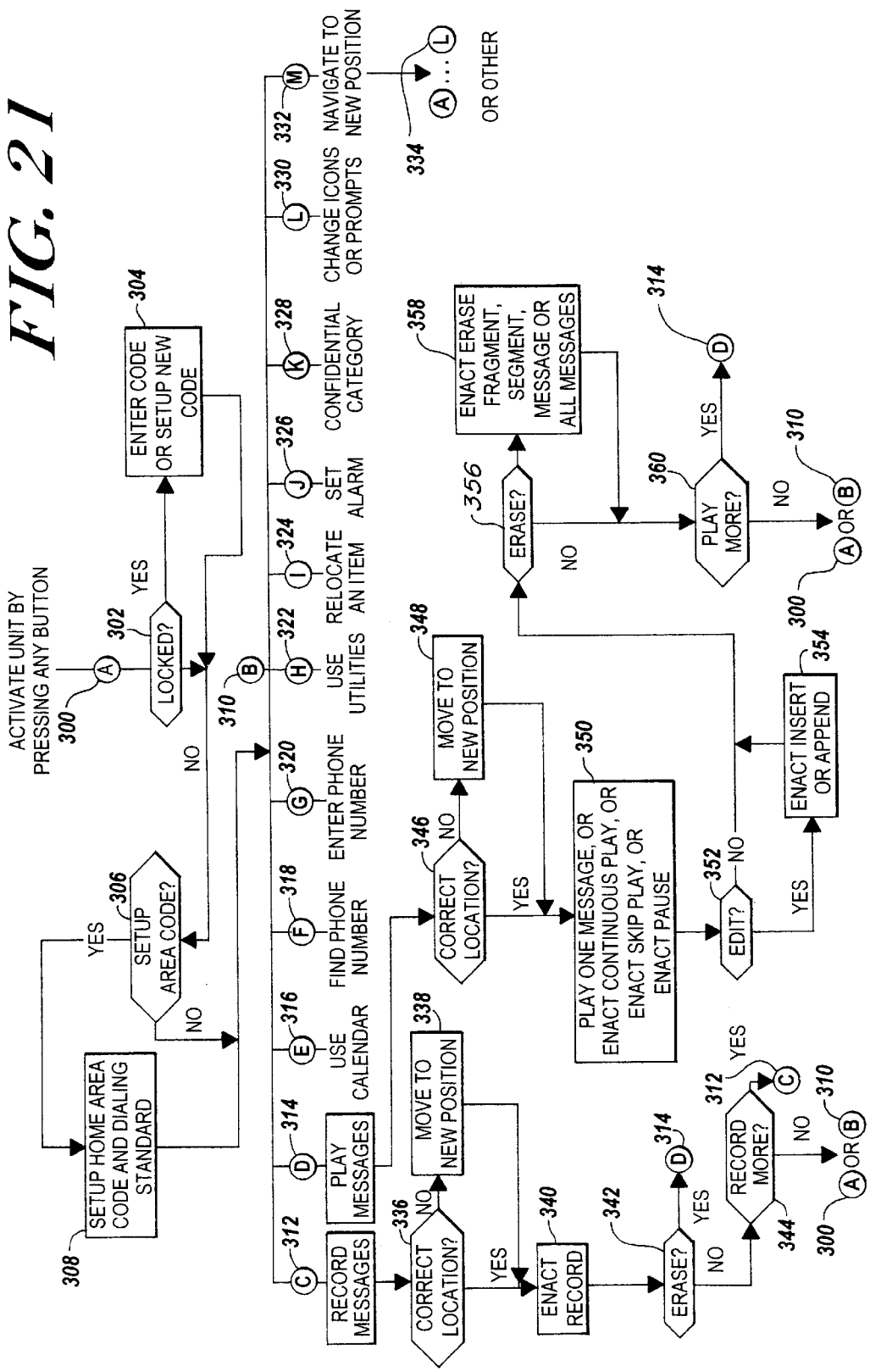
FIGS. 21–25 illustrate in flow diagram form various functions performed by the portable audio database device.

The Calendar category 176 provides the user the ability to access alarms, messages, and other information quickly and efficiently based on date and time stamp information. Referring now to FIGS. 20c and 20d, a user may press the option button 72 to access the Calendar category 176. The date indicated in the alphanumeric information window 110 reflects the present date by default. The total number of alarms that are scheduled from the current date and time are indicated by the alarm numbering indicator 106, in this case indicating thirty such alarms. The user may press and hold the edit button 74 to change the starting date to one in the past or the future using the previously described day/date entry procedures. As is indicated in FIG. 20d, changing the starting date to a previous date will indicate to the user all of the alarms and messages (i.e., all records) that have a date/time stamp that post date the selected starting date. In an example shown in FIG. 20c, a total of thirty alarms have been scheduled from the displayed date of Tuesday, Feb. 20, 1996. By changing the starting date to Monday, Feb. 5, 1996, a total of fifty alarms and messages have been scheduled from this new starting date, as indicated by the number indicator 106 and the message and alarm indicators 104b and 104c.

In order to access the scheduled messages and alarms, a user may scroll through the messages and alarms by using the appropriate navigation keys 64. It is noted that in many cases, it is useful to access the messages and alarms for a particular week, such as an upcoming week, in order to address the issues or deadlines associated with the messages and alarms for the upcoming week. As messages are played, the time/date stamp associated with a played message is updated to the current date, and the message counter 106 is updated. It is noted that all alarms are counted as a single alarm for future dates, even though an alarm may be a reoccurring alarm, such as an alarm that occurs every day, week, or month.

An important feature of the portable audio database device 40 concerns the ability to move messages and icons between categories. In order to move a particular message, a user navigates to the desired message location and selects the desired message to be moved. The user presses the select/enter button 70 which causes the associated icon to flash in the icon window 100. The user then uses the previously described navigation techniques and the option button 72 to choose a new category or file location. The user then presses the select/enter button 70 to "drop" the message into the new category or location. The set of recorded messages from which the selected message was moved are then appropriately re-ordered. In order to place a message currently located in the last position in a series of messages, the user scrolls to the last message using the Right key 64D, presses and holds the Right key 64D for several seconds, such as two to three seconds, and then "drops" the message into the new position in the message series. The messages located to the right of the newly inserted message are appropriately re-ordered.

When moving an icon from one category location to another category location, the user navigates to the Icon library 218 from the Utilities category 180 and selects the desired icon to be moved. The desired icon is selected by pressing the select/enter button 70, which results in flashing of the selected icon. The user then uses the navigation keys 64 and option button 72 in a manner previously described to navigate to a new location within a destination category, such as the Messages category 174 or phone category 178. The user then presses the select/enter button to "drop" the icon and its contents in the new location within the selected category. It is noted that both the icon and its default voice or text prompt, if applicable, are moved together with the selected icon. As described previously, the verbal prompt associated with the moved icon may be edited as desired.

If it is desired to delete one or more messages from a particular category, the user navigates to the particular message and listens to some or all of at least one of the messages to be deleted. This is a protection feature, although not necessarily required, that reduces the chances of mistakenly deleting desired messages. After listening to some or all of a selected message, the user presses and holds the erase button 76 until a double-beep is broadcasted along with a double-flashing of the red LED 62. The messages subsequent to the deleted message are reordered or re-labeled appropriately, and the total number of messages indicated by the message number indicator 106 is decremented by one message.

The user may erase all of the messages associated with a particular category by, after listening to all or part of at least one message in the category, holding the erase button 76 for approximately six seconds, after which a triple-beep is broadcaster over the speaker 48 and the red LED 62 is flashed at least three times, thus indicating that all messages in the category have been erased. If it is desired to delete an entire phone contact record, including the contact's recorded name 206, all office, home, and fax numbers 208, 210, and 212, as well as all contact notes 214 associated with the contact, the following procedure may be employed. The user may navigate through the hierarchical filing system to a particular contact 206. The contact record is selected by pressing and holding the edit button 74 until the Contact icon 206 begins flashing and the edit mode indicator 112*d* is displayed in the operating information window 112. The erase button 76 is held until the red LED 62 flashes and two beeps are broadcasted. The contact 206 and all associated information is erased.

If the user wishes to delete the contents of an entire channel, such as the Channel-1 186 category, the user navigates to the desired category to be erased. As a safety precaution, although not necessarily required, one of the messages in the category channel is accessed and, after listening to all or part of the message, the erase button 76 is pressed until the red LED 62 blinks and a beep-tone occurs. At this point, the user continues holding the erase button 76 until additional beep-tones are broadcasted and the red LED 62 once again blinks. Confirmation of a successful category channel erasure is indicated by an "erased" voice prompt broadcasted to the user.

As discussed previously, a user may change an icon associated with a category channel or change a verbal prompt associated with a particular icon. To create a new icon for one of the four user-defined channel categories 186, 188, 190, and 192, for example, the user navigates to the Icon library 218 accessed through the Utilities category 180. The Icon library 218 is accessed by pressing the select/enter button 70 or the Down key 64*b*. The user is then presented with two icon libraries that are viewable by scrolling to the left and to the right, respectively. A User's icon category 224 makes available icons that can replace the default categories/prompts initially defined for the home keys 50. The System icons category 230 is typically utilized to restore icons and prompts that may have been mistakenly or purposefully changed or deleted. The icon moving procedure discussed previously may be used to replace any one of the four category icons, defined by the home keys 50, and the pre-set category icons, namely, the icons for the four user-defined category Channels 186, 188, 190, 192, and the four preset category icons including the Expenses icon 252, Reminders icon 254, Events icon 256, and Groceries icon 258.

As discussed previously, some icons do not have associated with them a verbal prompt or label. If a user attempts to change a non-existent or non-permissible prompt for a particular icon, an error condition is conveyed to the user by communicating an appropriate error signal, such as a verbal error message being broadcasted over the speaker 48 or flashing of the red LED 62. The user may modify an existing verbal label for a particular icon by navigating to one of the four user-defined category channels or pre-set categories, and, with the icon displayed in the icon window 100, pressing and holding the record button 68 and uttering a verbal prompt which replaces the previous verbal prompt for the selected icon.

Turning now to FIGS. 21–25, there is illustrated in flow diagram form various functions performed by the portable audio database device 40. At step 300, the portable audio database device 40 is activated by pressing any button provided on the housing 41. If the Locked icon 232 is presented in the icon display 100, as is tested at step 302, the user enters the unlock code or may set a new unlock code at step 304. As is tested at step 306, the user may setup a home area code prefix and telephone dialing standard at step 308. Setting up a home area code dialing prefix allows the user, for example, to instruct the portable audio database device 40 to ignore the dialing code prefix when generating dial tones for in-area phone numbers. The dialing standard may be modified as desired to comply with any number of applicable telephony standards.

At step 310, the user may review and select a desired function by typically scrolling through the available menu selections by use of the navigation keys 64. As discussed previously, each of the functions and categories has associated with it a corresponding icon which immediately conveys to the user the nature of each function or category. From step 310, a user may record messages, at step 312, play messages, at step 314, access the calendar, at step 316, search and find a phone number, at step 318, enter a phone number, at step 320, or use any of the utility tools, at step 322. Additionally, a user may relocate any icon, prompt, label, or message at step 324, set an alarm, at step 326, create or modify a confidential category, at step 328, change an icon or prompt, at step 330, or navigate to a new position within the icon-based hierarchical filing structure, at step 332.

If the user desires to record a message, at step 312, the navigation keys 64 may be used to navigate to the correct message location, as indicated at steps 336 and 338, and, at step 340, may execute the record function to create a desired message or note. If desired, as is tested at step 344, the user may record additional messages or notes by repeating the steps initiated at step 312. Alternatively, the user may return to steps 300 or 310 by exiting the current function. If it is desirable to erase one or more messages, as is tested at step 342, the user must play part or all of a message to be deleted prior to erasure as a safety precaution, at step 314.

If the user wishes to play one or more messages, or erase one or more messages, the user navigates to the correct message location, as is indicated at steps 346 and 348. At step 350, the user may play a single message, enact continuous play of all messages in a particular category, or enact skip, play, or pause operations by enacting the steps discussed hereinabove. If, at step 352, a user wishes to edit a particular message, the user typically plays the message to the point in which the edit is to be performed and enacts an insert or an append function at step 354.

Inserting a verbal segment within a message is accomplished by playing the message to a location at which the insert is to be made, pressing the insert button 77 which pauses playback, pressing the record button 68 and recording the verbal segment insert, pressing the record button 68 to terminate recording and to pause operation, and then pressing the insert button 77 once again to save the insert and exit the insert mode. It is noted that a user may selectively stop and start recording while creating a verbal insert by selectively actuating the record button 68. After recording the verbal insert, the user may press the insert button 77 to save the verbal insert. Pressing the edit button 74 at any time exits the insert operation without saving any changes.

If, at step 356, the user wishes to erase a portion of a message, an entire message, or all messages in a category or channel, an erase function is enacted at step 358. It is noted that a fragment is understood to represent the smallest individual memory unit that stores verbal information as established by a particular memory configuration. The term segment is understood to represent a number of fragments, including a portion of a message or an entire message. For example, a user may mark a portion of a message by pressing the mark button 75 at a starting location in the message during playback, and then hitting the mark button 75 again at an ending location in the message. The marked portion may then be played back by pressing the play button 66 to verify the message portion to be erased. The erase button 76 may then be pressed to erase the marked portion of the message. Pressing the edit button 74 at any time exits the erase operation without saving any changes. At step 360, the user may continue playing more messages by repeating the sequence of steps initiated at step 314 or, alternatively, exit the play messages function.

Figure 22:
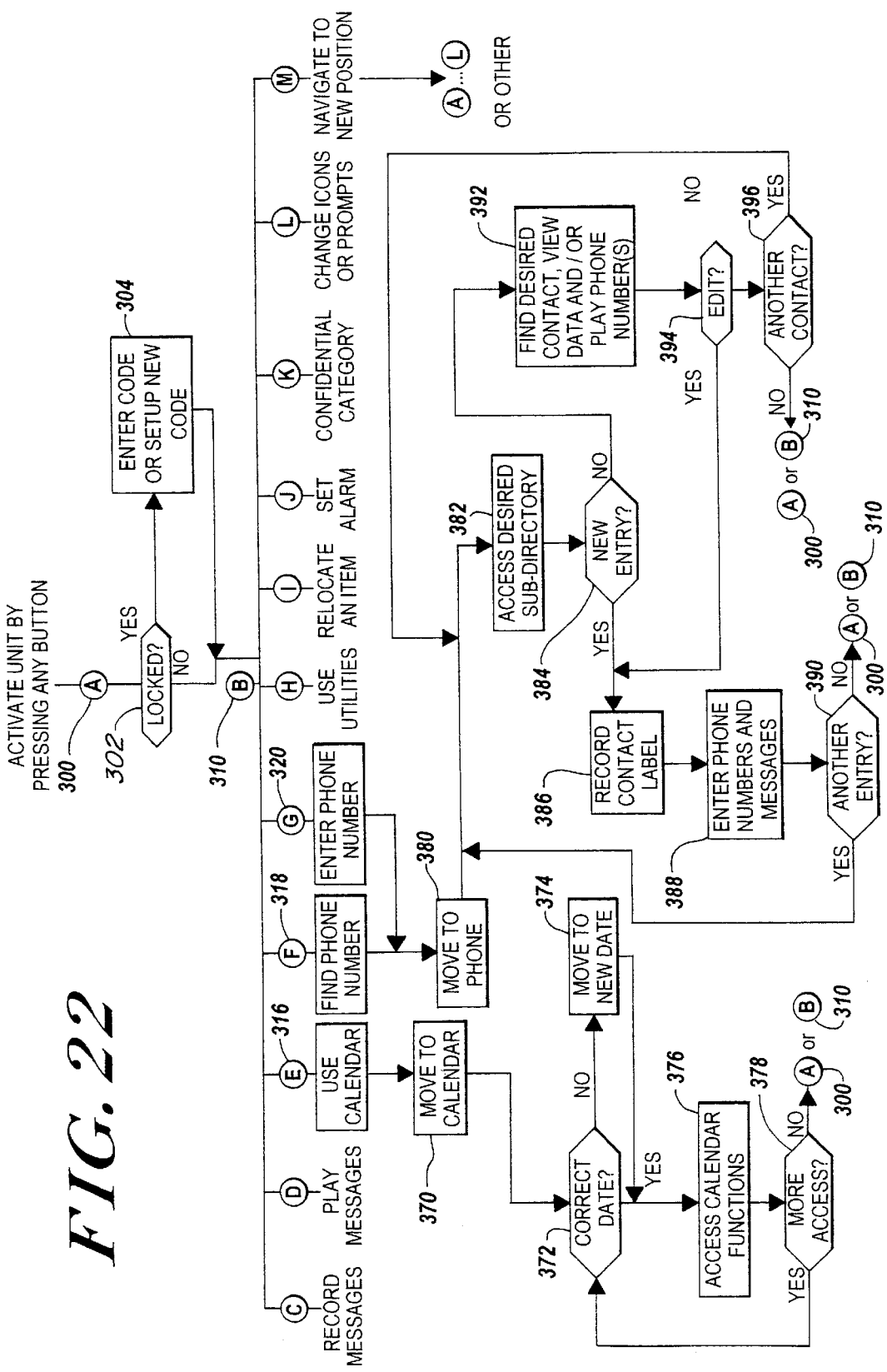

As is shown in FIG. 22, a user may access the Calendar category, at step 316, by navigating to the Calendar icon 176. At steps 372 and 374, a user may select a desired calendar date by employing the procedure discussed previously. The various calendar functions described hereinabove may be accessed and executed at step 376. If the user wishes to access additional calendar functions or information through the calendar category 176, the user may return to step 372 and select a desired date and calendar function.

Figure 23:
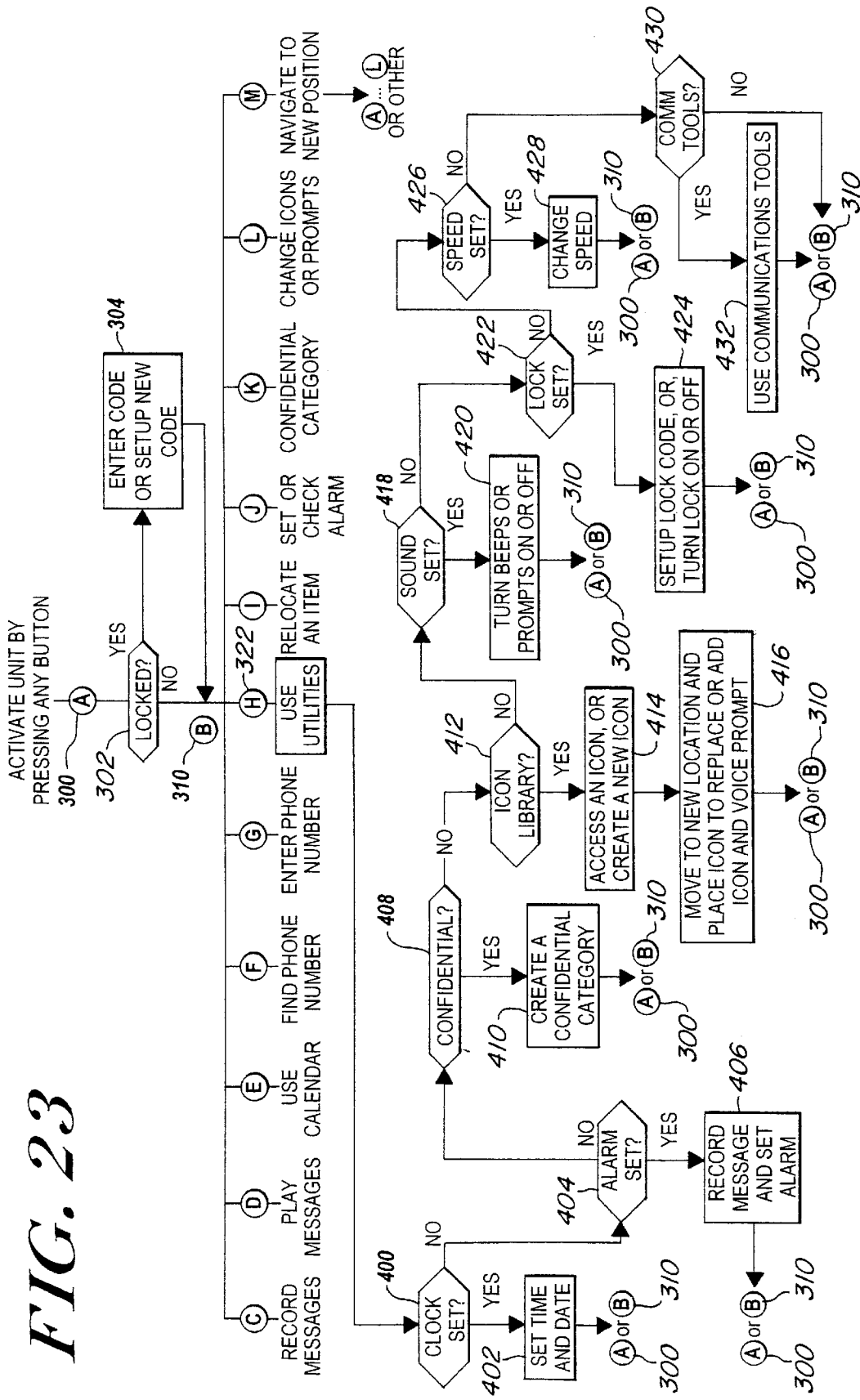

Referring now to FIG. 23, a user may access the Utilities category at step 322. The system clock time and date parameters may be programmed in a manner previously discussed at steps 400 and 402, and, if desired, alarms may be set and associated messages recorded at steps 404 and 406. At steps 408 and 410, a user may create a confidential category which may be password protected, thus requiring input of an appropriate password to gain access to the confidential category. At steps 412, 414, and 416, a user may access the Icon library 218 in order to modify or create a new icon, move icons to new locations, replace icons, and replace, delete, or alter voice prompts and labels associated with icons.

The Sound and Lock utilities 220 and 222 may be accessed and utilized at steps 418 and 422, respectively. Beep tones and verbal prompts may be enabled or disabled at step 420, and lock setup codes may be established or locks enabled or disabled at step 424. The Speed utility 236 may be accessed at step 426 in order to change the operating speed, at step 428, between a standard play (SP) mode 238 and a long play (LP) mode 240. A variety of communication tools may be accessed, at step 430, and modified to establish communications with a variety of external communication channels, devices, and networks.

Figure 24:
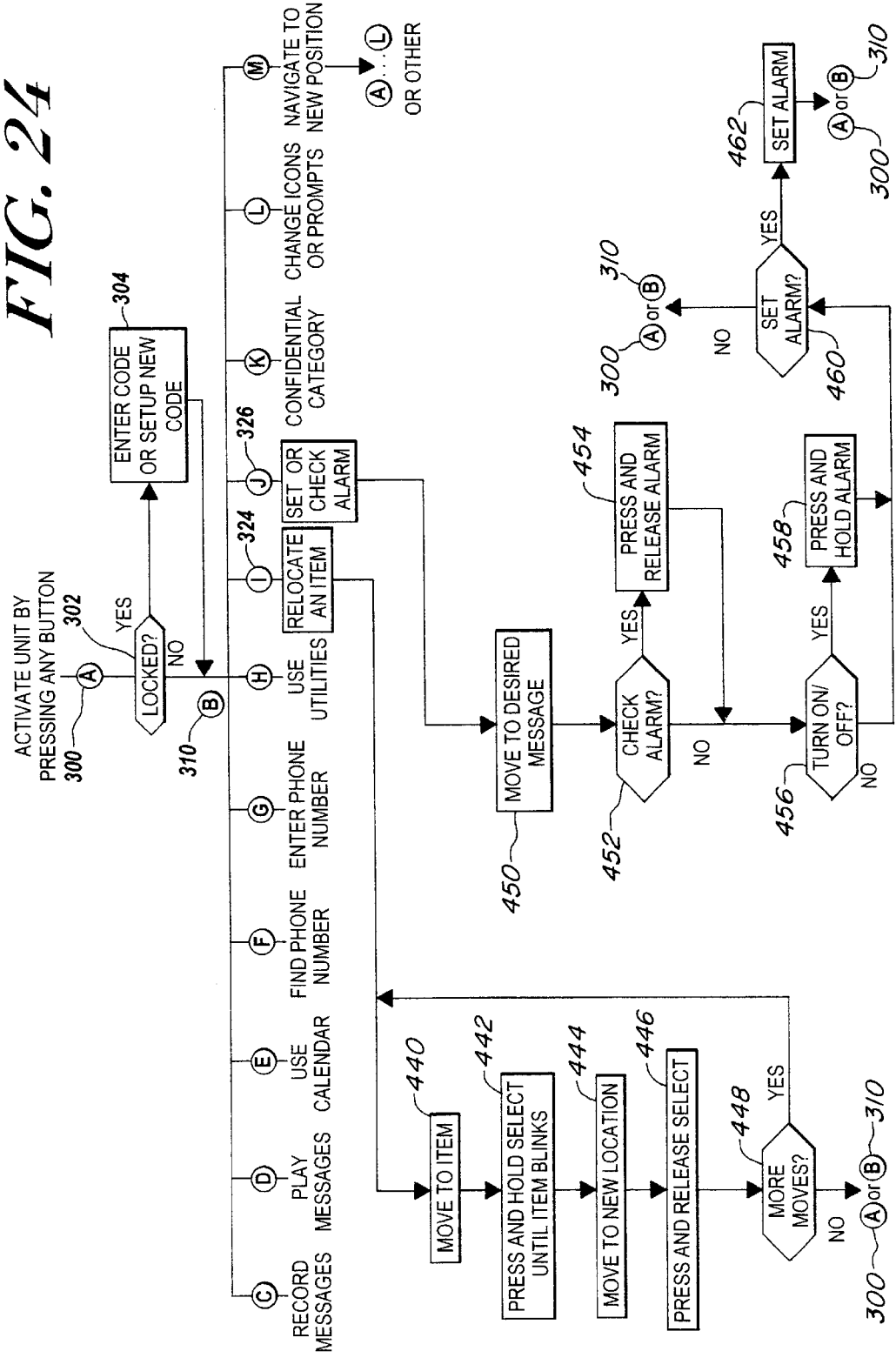
Figure 25:
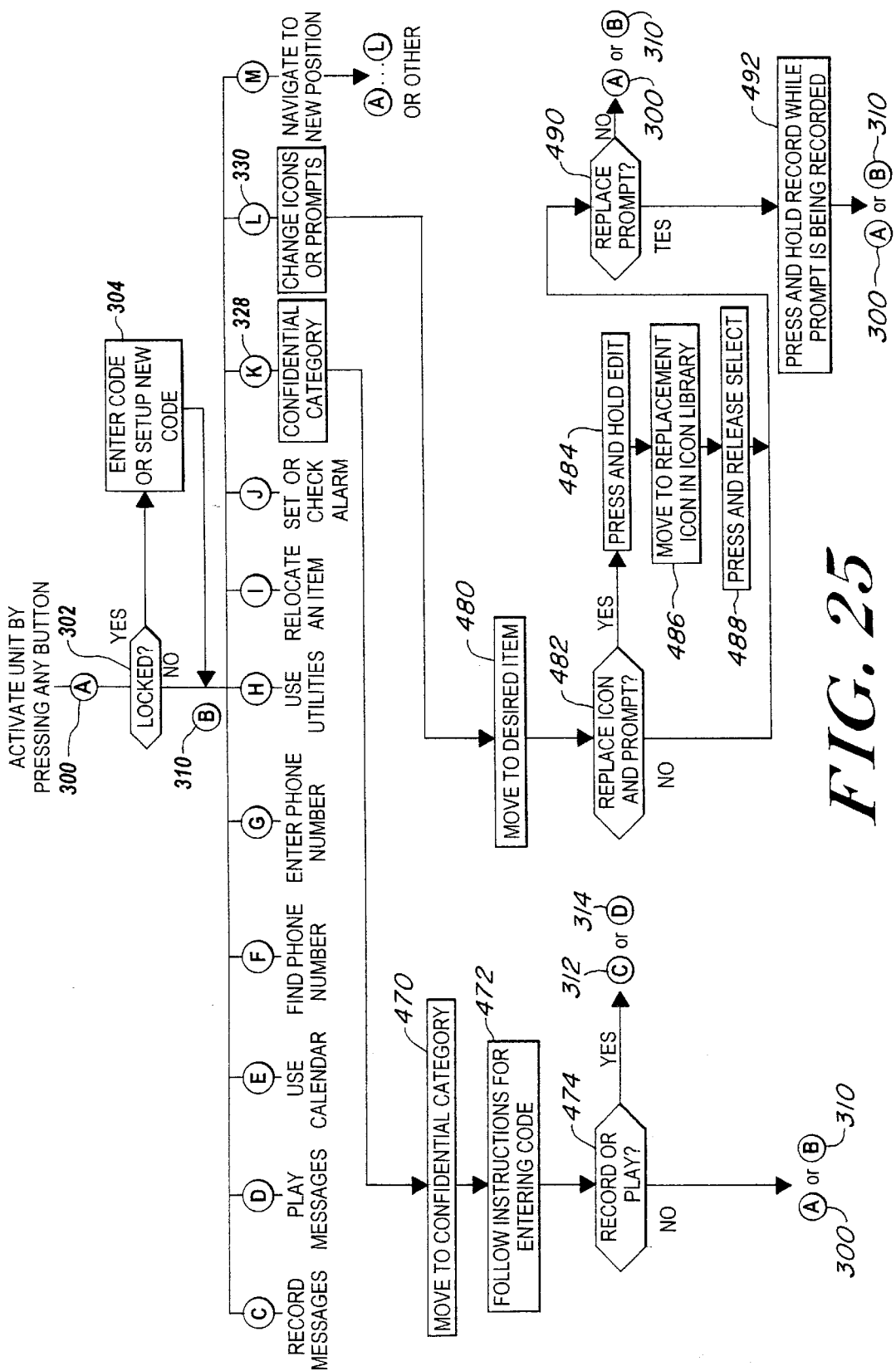

As is shown in FIG. 24, an item, such as an icon, message or prompt, may be relocated at step 324. Item relocation may be initiated at step 440 by pressing and holding the select button 70 until the icon representative of the item transitions to a blinking state, as indicated at step 442. The user may then navigate to a new location within the hierarchical filing structure at step 444, and then press and release the select/ enter button 70 to "drop" the item at the new location, at step 446. Additional item relocation operations may be effectuated, as is tested at step 448, by repeating the steps initiated at steps 440.

At step 326, alarms may be set or checked by initially moving to a desired message, as indicated at step 450. If an alarm is to be checked, as tested at 452, the alarm button 78 is pressed and released at step 454. The alarm may be toggled between an ON state and an OFF state by pressing and holding the alarm button 78, as is indicated at steps 456 and 458. If it is desirable to set an alarm, as is tested at step 460, one or more alarms may be set by the procedure previously discussed at step 462.

A user may access a confidential category, at step 328, by first navigating to the confidential, category at step 470. The appropriate password is then entered, at step 472, to provide access to the confidential category. A user may record messages or playback messages in the confidential category as is indicated at steps 474, 312, and 314.

The procedure for changing an icon or icon prompt is initiated at step 330. The user navigates to the desired icon at step 480, and, as is tested at step 482, a selected icon is changed by pressing and holding the edit button 474 at step 484, moving the replacement icon from the Icon library 218 to the new location, at step 486, and pressing and releasing the select/enter button 70, at step 488, to replace the previously presented icon with the replacement icon moved from the Icon library 218. If, at step 490, a user wishes to replace a verbal prompt associated with an icon, the record button 68 is pressed and held while the user utters the verbal prompt at step 492. The new verbal prompt replaces the previously established verbal prompt.

Figure 27:
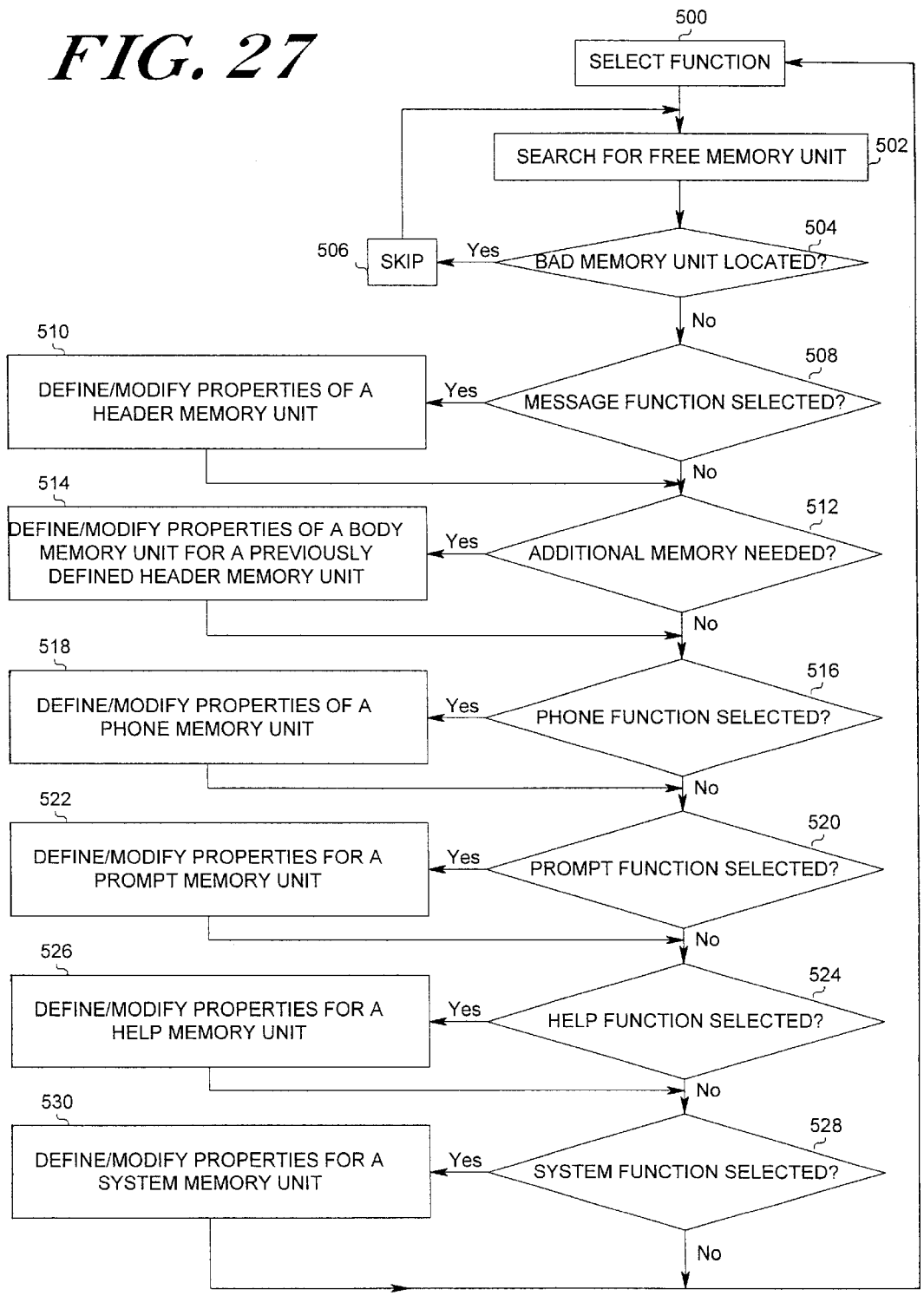
FIG. 27 illustrates a procedure for defining and modifying properties of the various memory object structures supported in the memory of the portable audio database device.

Referring now to FIGS. 26 and 27, an advantageous feature of the portable audio database device 40 concerns the organization of the system memory 122 and, where applicable, the external memory module 124. In a preferred embodiment, the icon-based hierarchical filing structure which provides for efficient creation, manipulation, and association of stored information, is facilitated by a memory object structure as described in FIG. 26. It is noted that the unique memory object data structure described herein was developed to make efficient use of flash memory devices, including on-board system flash memories and external modular flash memory cards. In one embodiment, the system memory 122 is divided up into fixed-size allocation units. A fixed-size configuration may be used in systems in which computational simplicity is desired. It is to be understood, however, that the allocation units comprising system memory or external modular memory may be variable in size. Each allocation unit defined in the memory 122 represents an object, with each object including a header, which identifies the object and describes its properties. The object types utilized by the portable audio database device 40 are described in FIG. 26. It is understood that memory objects other than those illustrated in FIG. 26 may be utilized to accomplish functions other than, or in addition to, those described herein.

As is described in FIG. 26, a Free object 540 represents an object that is currently available to be converted into another object type. A Free object 540 is typically made available as a result of an erasure procedure, or when utilizing previously unused system memory 122 or external memory 124. Initially, no properties are defined for a Free object 540. A Bad object 542 represents an object that is defective, and therefore should not be used or converted into another object. A Header object 544 represents an object that is associated with the header or beginning portion of a voice or text message. A Header object 544 has associated with it various properties, including a channel number, a time/date stamp, a unique identification (ID) number, an alarm type and status, a size, voice data, and text data properties. A Body object 546 is an object that is linked to a Header object 544 by means of a common ID number. A Body object 546 contains voice data and/or text data in addition to that contained in the voice data property of a related or linked Header object 544. The Body object 546 also includes a sequence order property which identifies the order of a particular Body object 546 with respect to other Body objects sharing a common ID number. The data contained in a Body object 546 is typically linked to a Header object 544, a Phone object 548 or a Prompt object 550.

A Phone object 548 is an object that contains information for a Phone contact 206. A Phone object 548 has associated with it various properties, including a channel number, time/date stamp, unique ID, size, and three phone number properties, each of which may contain up to 20 digits. A Prompt object 550 is an object that contains the voice prompt label for a particular message channel. A Prompt object 550 has associated with it a number of properties, including a channel number, unique ID number, icon, password, size, voice data, and text data property. A Help object 552 is an object that contains pre-established voice prompts which, when requested, are broadcasted to the user as help messages that assist the user in operating the portable audio database device 40. Help objects 552 are generally not relocatable after they are created. A Help object 552 includes the following properties; an index for each prompt, which is generally applicable only for the first Help object of the series of Help objects; the size of each prompt, which is typically applicable only to the first Help object; and any voice data or text data associated with the Help object 552. The System object 554 is an object that contains passwords and system configuration settings. Generally, there is only one system object, and therefore, no unique object ID number is required. A System object 554 includes a number of properties, including passwords, icons, and system settings.

Each memory object contains all of the information needed to maintain a fully indexed operating system. By way of example, when playing a given message, the operating system locates the Header object 544 containing the desired time/date stamp and channel number properties, and then, using the unique ID number property, locates all of the Body objects 546 associated with the Header object 544. The voice data contained in the Header object 544, and, if applicable, in one or more Body objects 546 associated with the Header object 544, is then played back in ordered sequence beginning with the voice data contained in the Header object 544 followed by the voice data contained in associated Body objects 546 in sequence order.

A significant advantage realized by employing an operating system that exploits the memory object structure as described herein concerns the elimination of fixed pointers and look-up tables associated with conventional operating system schemes. Since there are no fixed pointers or look-up tables required when utilizing the described memory object structure, objects may be relocated anywhere in memory as may be required during memory management operations without the need to repeatedly rewrite an index. This is particularly advantageous when employing a flash memory-based operating system. Since flash memory is typically organized using pages or sectors of memory, the blocks or streams of audio information associated with the memory objects can be efficiently stored in the pages or sectors of the flash memory without expending additional processor resources otherwise required when employing conventional memory management schemes. FIG. 27 illustrates in flow diagram form the enhanced efficiency by which an object-oriented operating system manages the creation and modification of the various objects, also termed allocation units, supported in the memory 122 of the portable audio database device 40.

Further, since object properties are contained within each object, properties may be changed as needed without effecting other objects stored in the memory 122. By way of example, when moving a particular message from one channel to another channel, the system need only change the channel number property 510 in the Header object 544 for the particular message, as indicated at step 510 of FIG. 27. It can be appreciated that the object properties themselves create a relational index. It can be further appreciated by those skilled in the art that the object-oriented storage methodology described hereinabove provides for the efficient relocation and re-association of icons, verbal labels, messages, text, and other properties within the system memory 122 or external memory module 124. It is noted that the advantages realized by implementing an object-oriented storage methodology, such as that described with reference to the embodiments of FIGS. 26 and 27, results in an operating system that does not maintain a conventional index. As such, the operating system must typically perform a search through all objects to find a desired object. This additional demand on operating system resources, however, does not compromise overall system performance since the hardware and software performs this search in an acceptable duration of time, and any resulting delay is therefore imperceivable to the user. It is anticipated that as flash memory size increases, the speed of processors will concomitantly increase to offset a more lengthy search process. Search efficiency can also be improved through the use of preferred placement of objects in system memory 122. For example, although an object can be placed anywhere in memory, it may be desirable to maintain a preferred location in the memory which can be searched and accessed with a reduced search time. Various known caching techniques may also be adapted to enhance the searching process.

Figure 28:
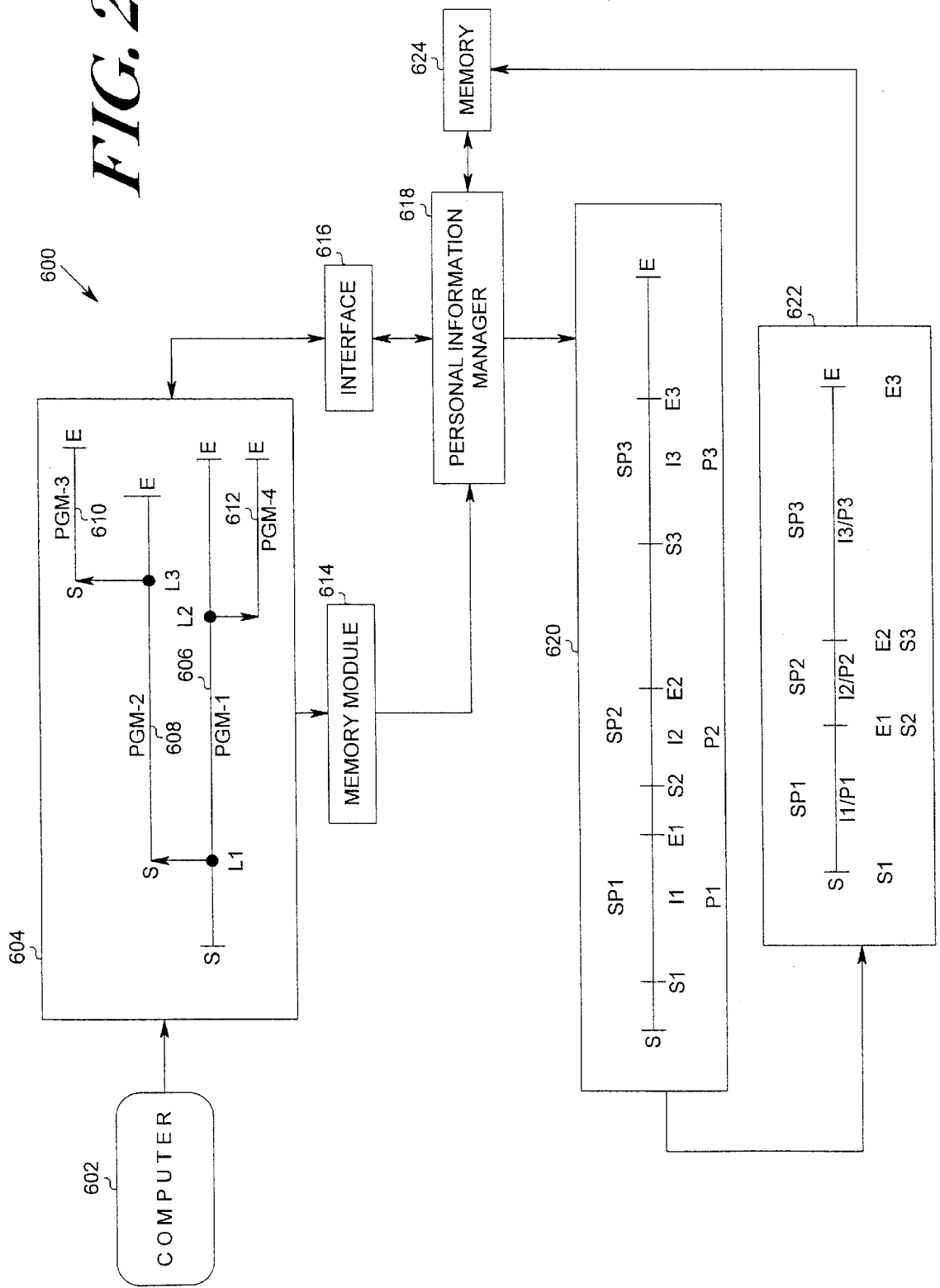
FIG. 28 is an illustration of an audio database system employing a computer-based audio program library and a portable audio database device for selectively marking and downloading audio program portions for subsequent use by the user of the portable audio database device.

Referring now to FIG. 28, there is provided an illustration of an audio program marking and composing system 600 that includes a computer 602 or other storage medium containing audio programming and a portable audio database device 618. In accordance with one application effected through cooperative operation between the computer 602 and the portable audio database device 618, a user may review one or more audio programs contained in an audio database 604, mark selected portions of one or more of the audio programs contained therein, download the marked audio program portions from the audio database 604 to the memory 624 or memory module 614 of the portable audio database device 618, and manipulate the downloaded audio segments to compose a desired audio program. The audio database 604 includes one or more audio programs which can be reviewed and selected by use of the portable audio database device 618 which communicates with the audio database 604 through use of an interface 618. The portion of the audio database illustrated in FIG. 28 is representative of a "hypertext" type of audio program, referred to herein as hyperaudio or hyperlink audio, which includes a primary audio program PGM-1 606 from which other audio programs can be accessed, such as the programs PGM-2 608, PGM-3 610, and PGM-4 612. The illustrated audio program may be viewed as a hyperaudio type of audio program, since various deviations from a primary program may be effected at various branch points in the primary and related audio programs by a user. By way of example, a user may utilize the navigation capability of a portable audio database device 618 to review a primary program PGM-1 606, and, at a desired or predetermined location, branch to a secondary program PGM-2 608 or PGM-4 612. While reviewing the secondary audio program PGM-2 608, for example, the user may again branch to a tertiary audio program PGM-3 610. It is to be understood that the programs illustrated in FIG. 28 may be linked or associated with one another as previously discussed or may be independent programs which may be accessed or reviewed individually by the user as desired.

For purposes of illustration, it is assumed that the program PGM-1 606 is a recording of a lecture given by professor on a particular topic. Programs PGM-2 608, PGM-3 610, and PGM-4 612 are assumed to represent lectures given by other professors on subjects discussed during, or related to, the lecture represented by program PGM-1 606. As can be appreciated, a student, professional, or other user of the portable audio database device 618 may only be interested in selected portions of one or more of the four described lectures. As such, it may be desirable to mark certain segments or portions of one or more of the lectures, and store the segments in the system memory 624 or in a memory 624 coupled to the portable audio database device 618 for subsequent review when, for example, studying for an exam.

Within the context of this illustrative example, a user accesses the audio database 604 through an interface 616 to which a portable audio database device 618 is coupled. Using the navigation techniques described hereinabove, the user reviews a particular program, such as program PGM-1 606, and, upon reviewing a portion of interest, tags or marks the beginning and end locations of the pertinent audio portion. This tagging operation may be accomplished by, for example, pressing the record button 68 a first time while reviewing the pertinent portion of the program PGM-1 606 and then pressing the record button 68 a second time when reaching the end point of the desired program portion. Having captured the relevant portion of the program PGM-1 606, referred to hereinafter as subprogram-1 (SP1), the user may select an icon and/or record a verbal label that identifies the subprogram SP1. The subprogram SP1 and its associated icon and verbal label are stored in the memory 624 or memory module 614. As is illustrated in the composition box 620, the first subprogram SP1 downloaded from the audio database 604 defines a start point S1 and an end point E1 corresponding to the marked audio portion of the program PGM-1 606. The composition box 620 also illustrates that the subprogram SP1 has associated with it an icon I1 and a verbal prompt P1.

It is further assumed in the illustrative example of FIG. 28 that the user tags or marks an audio program portion from the secondary audio program PGM-2 608. The subprogram SP2 downloaded from the audio database 604 is represented in the composition box 620 as a portion of program PGM-2 608 defined between a start point S2 and an end point E2, with icon I2 and verbal prompt P2 being associated with the subprogram SP2. As is shown in the composition box 620, the user may tag and download a subprogram SP3 derived from the tertiary program PGM-3 610 and associate an icon I3 and a verbal prompt P3 with the subprogram SP3. The user may then manipulate the order or further modify or edit each of the subprograms shown in the composition box 620 until a desired composite program is produced, as is illustrated in the composition box 622. It is noted that the user may create one or more messages or commentaries concerning any of the subprograms, SP1, SP2, and SP3. The composite audio program is stored in the memory 624 or memory 614 and available for subsequent review and further modification as desired.

It is noted that the hyperlink audio program described as being maintained in the audio database 604, may, instead, be stored in an external memory module 614 which may be coupled to the portable audio database device 618. Alternatively, an external memory module 614 may be initially coupled to the portable audio database device 618, and the audio information downloaded from the audio database 604 may be stored in the external memory module 614 rather than in the system memory 624. It will be appreciated that the audio program described as a series of related lectures may instead be representative of books, speeches, music, and other audio content.

Viewing the illustrative application shown in FIG. 28 in another context, the hyperaudio program stored in the audio database 604 may include embedded audio prompts and icons at particular locations within the programs. Part or all of the hyperaudio program may then be downloaded to the portable audio database device 618 and stored in the system memory 624 or an external memory module 614. The downloaded audio program containing embedded prompts and icons, after being accessed, may be executed by the user by pressing the play button 66. In accordance with this illustrative embodiment, the program PGM-1 606 is played back and, upon reaching a predetermined location L1, the first embedded icon may appear in the icon window 100 indicating the existence of a branch point to a secondary program PGM-2 608. The user may activate the secondary program PGM-2 608 by again pressing the play button 66 or, alternatively, ignore the icon and/or verbal label and continue listening to the primary program PGM-1 606. Other predetermined branch points, such as locations L2 and L3, may be provided to permit excursions from the primary program PGM-1 606 to other programs, such as secondary program PGM-4 612 or tertiary program PGM-3 610.

Figure 29:
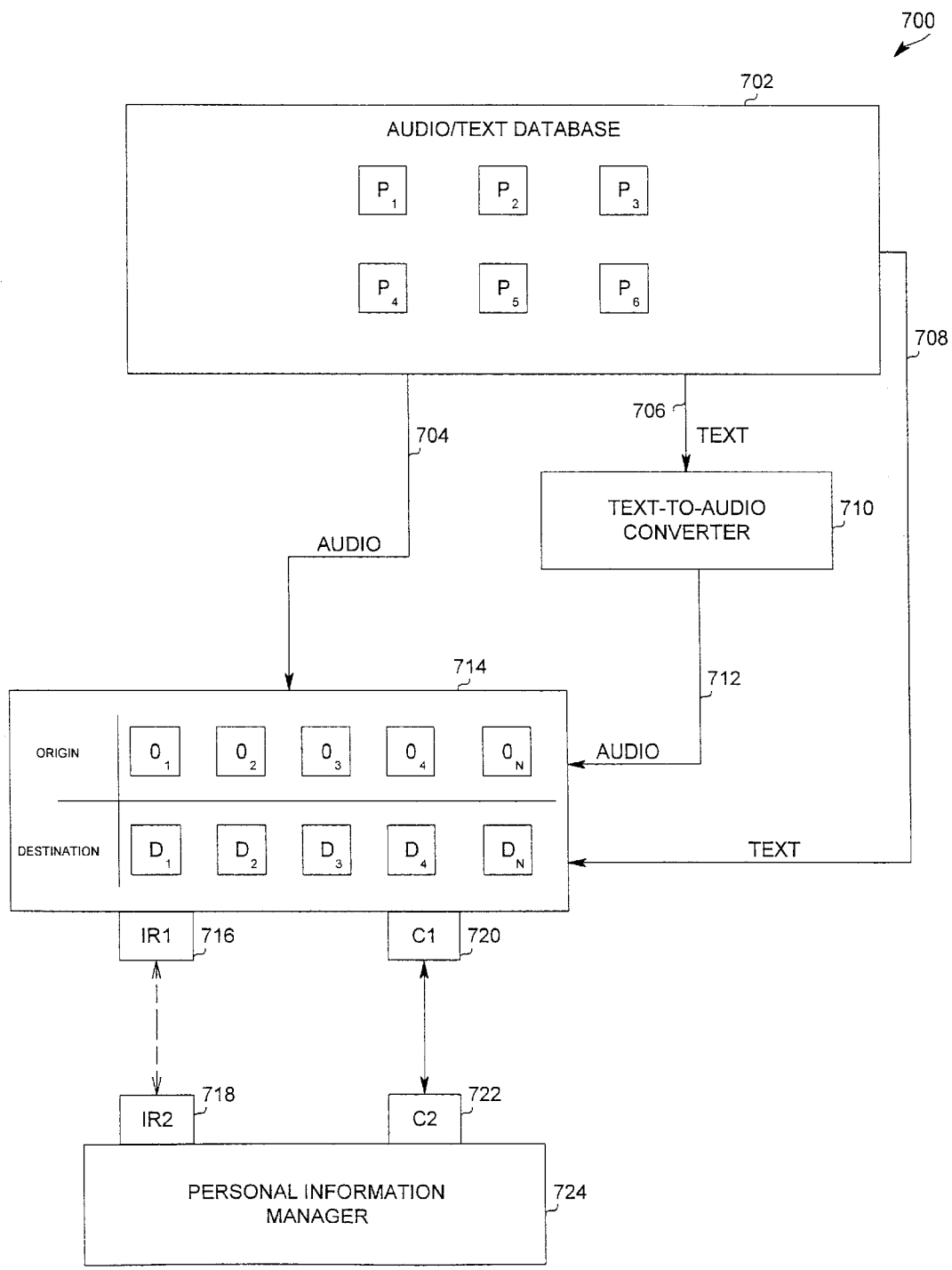
FIG. 29 is an illustration of an audio and text information system employing an audio/text database and a portable audio database device for downloading selected audio and text information from the audio/text database to the portable audio database device.

In accordance with the embodiment illustrated in FIG. 29, a portable audio database device 724 may be used to communicate with an audio/text database 702 to permit a user to selectively review and download various audio and text information contained in the audio/test database 702. It is assumed, for purposes of illustration, that the audio/text database 702 contains audio and text information that assists a user in driving from one location to another location. It may be desirable, for example, for a car rental company to provide a service by which a customer can obtain specific driving information from an automated system which assists the customer in driving from various origin locations to various destination locations, and to provide information or intermediate locations and points of interest, such as motels, restaurants, national parks, and the like.

In accordance with this example, the customer may employ the portable audio database device 724 to store downloaded origin and destination information, and other interest information, from the audio/text database 702 which can later be accessed by the customer when driving to and from desired locations. By way of example, the customer may communicate with the audio/text database 702 by use of an interface 714 in which a series of origin buttons, $0_1$ through $O_N$, correspond to particular origin locations, and a series of destination buttons, $D_1$ through $D_N$, correspond to particular destination locations.

It is assumed that the origin button $0_1$ represents the location of the rental agency at a particular airport, and that the destination button $D_1$ represents the location of a downtown hotel. Communication between the database interface 714 and the portable audio database device 724 may be accomplished by the use of a hardwire connection coupled to corresponding connectors 720 and 722 or, alternatively, through IR transceivers 716 and 718, respectively. Upon pressing the origin and destination buttons $O_I$ and $D_1$, audio and/or text information that assist the customer in driving from the airport location $O_1$ to the downtown hotel location $D_1$ is retrieved from the audio/test database 702 and transferred to the portable audio database device 724. It may be desirable to provide the customer with the option to receive a combination of audio and text information, or either audio or text information exclusively. A text-to-audio converter 710 may be employed to convert text instructions into corresponding audio instructions. It is noted that the downloaded instructions, whether in audio, text, or combination form, may be associated with a selected icon and/or verbal label in a manner discussed previously.

It is to be understood that a user may download other combinations of origin and destination location information to providing additional driving assistance to the customer. It is further noted that text instructions that are downloaded to the portable audio database device 724 may be converted to corresponding synthesized speech by the text-to-speech processor 156 provided in the portable audio database device 724. Similarly, audio information may be converted to corresponding text by the speech-to-text processor coupled to the CPU 120 of the portable audio database device 724.

Figure 30:
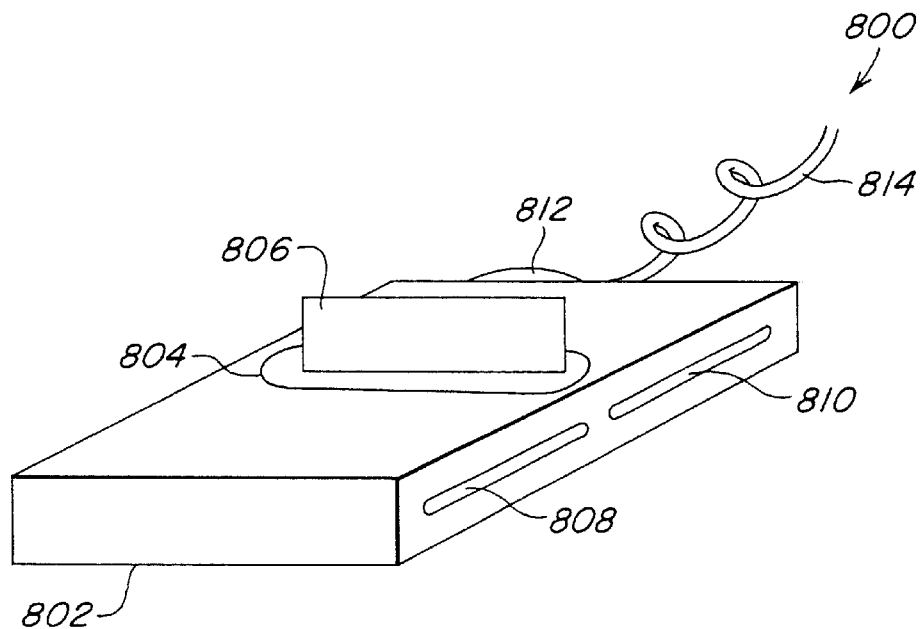
FIGS. 30 and 31 illustrate two embodiments of a docking station that interfaces with a portable audio database device and an external computer or peripheral device.

In FIG. 30, there is illustrated an embodiment of a docking station adapted to communicate with a portable audio database device 40 coupled thereto by means of an IR interface 812 or a communications line 814. The docking station includes a printer 804 which provides printouts of text information, and audio information converted to text form, and transferred from the portable audio database device 40. Two card slots 808 and 810 are configured to receive external memory modules 124. Information stored in the portable audio database device 40 may be transferred to an external memory module 124 coupled to either one of the card slots 808 or 810. Further, information may be copied between external memory cards 124 respectively coupled to card slots 808 and 810. Further, information stored on an external memory module 124 coupled to either card slot 808 or 810 may be uploaded to the portable audio database device 40.

In accordance with one embodiment, an application program stored on an external memory module 124 may be uploaded to the system memory 122 or another external memory module 124 coupled to the portable audio database device 40. The application may include instructions, icons, prompts, and the like, which, when executed by the portable audio database device 40, configure the system memory with a memory object structure defined by the application. The application may then be utilized by the user as desired.

An alternative embodiment of a docking station is illustrated in FIG. 31. The docking station 900 includes an IR interface 910 and a communication line 912 for coupling the docking station 900 to a personal computer or other peripheral device. A coupling slot 904 is provided on the housing 902 to couple a portable audio database device 40 to the docking station 900. Information may then be communicated between the external computer or peripheral device and the portable audio database device 40. It is noted that a software program that emulates the operating system and functionality of the portable audio database device 40 may be operating on a personal computer coupled to the docking station 900. A personal computer configured with a virtual copy of the portable audio database device software may enhance the communication of information between the portable audio database device 40 and the computer, as well as the transferring of applications and databases between the two systems. It is noted that any number of portable audio database device applications may be stored on external memory modules 124. A user may select a particular application and access the application by coupling the external memory module 124 to the portable audio database device 40.

It will, of course, be understood that various modifications and additions can be made to the embodiments discussed hereinabove without departing from the scope or spirit of the present invention. Accordingly, the scope of the present invention should not be limited to the particular embodiments listed above, but should be defined only by the claims set forth below.

We claim:

1. A portable voice database device, comprising:
    a hand-held housing;
    a speaker provided on said housing;
    a memory configured to support an audio database for storing verbal messages, said audio database including a hierarchical storage location structure having at least two categories;
    a display, provided on said housing, to display graphical information, alphanumeric information, and icons that graphically represent distinct categories;
    a microphone, provided on said housing, to receive a verbal message from a user;
    a user-actuated navigation control panel, provided on said housing;
    said user-actuated navigation control panel including,
        a first input device to navigate a visual feedback indicator around a display area having a plurality of distinct icon categories corresponding to said hierarchical storage location structure and to select one of the displayed distinct icon categories,
        a second input device, outside the display area, to select directly a first category of said hierarchical storage location structure, and
        a third input device, outside the display area, to select directly a second category of said hierarchical storage location structure; and
    a processor, coupled to said memory, said display, and said user-actuated navigation control panel, to effect displaying of one of the icons on said display when navigating selecting a corresponding one of the categories of said hierarchical storage location structure, and to effect storing of the verbal message received by said microphone in the selected category within said hierarchical storage location structure of the memory.

2. The device of claim 1, wherein the memory comprises non-volatile memory.

3. The device of claim 1, further comprising a communication adaptor coupled to the processor to communicate the verbal messages stored in the memory to a device external to the voice database device.

4. The device of claim 1, further comprising a voice conversion device coupled to said processor to convert the verbal message received from the user to corresponding command signals, wherein said processor effects the navigation of the categories of said hierarchical storage location structure and selection of a category of said hierarchical storage location structure using the command signals.

5. The device of claim 1, further comprising a voice conversion device coupled to the processor to convert the verbal message received from the user to corresponding ASCII information.

6. The device of claim 1, further comprising an interface provided on the housing to receive text information from an information source external to the voice database device.

7. The device of claim 6, further comprising a text conversion device coupled to the processor to convert the text information to corresponding verbal information.

8. A method for storing and retrieving voice information to and from a memory of a portable hand-held voice recording device, comprising the steps of:

provuding a memory for storing icons and for storing verbal messages in hierarchically organized storage location structure categories, the icons graphically representing the hierarchically organized storage location structure categories;

displaying graphical information, alphanumeric information, and icons that graphically represent distinct hierarchically organized storage location structure categories;

providing a user-actuated navigation control panel that includes a first input device to navigate a visual feedback indicator around a display area having a plurality of distinct icon hierarchically organized storage location structure categories and to select one of the displayed distinct icon hierarchically organized storage location structure categories, a second input device, outside the display area, to select directly a first hierarchically organized storage location structure category, and a third input device, outside the display area, to select directly a second hierarchically organized storage location structure category;

selecting a hierarchically organized storage location structure category using the provided user-actuated navigation control panel;

receiving a verbal message from a user; and storing the verbal message in the selected hierarchically organized storage location structure category of the memory.

9. The method of claim 8, including the further steps of:

storing verbal prompts in the memory, the verbal prompts indicating the categories; and broadcasting one of the verbal prompts when selectively navigating the corresponding one of the categories.

10. The method of claim 8, including the further step of editing the verbal message stored in the selected category by any of the steps of deleting the verbal message, deleting a portion of the verbal message, or inserting a verbal message portion into the verbal message.

11. The method of claim 8, including the further steps of:

linking a first icon with a first category; and selectively linking the first icon with a category other than the first category.

12. The method of claim 8, including the further steps of:

setting an alarm for the verbal message stored in the selected category; and broadcasting a verbal alarm message associated with the alarm at a pre-established time of day.

13. The method of claim 8, including the further steps of:

selecting a second category; and moving at least a portion of the verbal message stored in the selected category to the second category.

14. A method for storing and retrieving information to and from a memory of a portable hand-held audio database device, comprising the steps of:

providing a memory to store icons and configured to support a hierarchical memory structure having categories, the icons graphically representing the categories;

displaying graphical information, alphanumeric information, and icons that graphically represent distinct categories within the hierarchical memory structure;

providing a user-actuated navigation control panel that includes a first input device to navigate around a display area representing the hierarchical memory structure and to select one of the displayed distinct icon categories, a second input device, outside the display area, to select directly a first category of the hierarchical memory structure, and a third input device, outside the display area, to select directly a second category of the hierarchical memory structure;

selecting a category of the hierarchical memory structure using the provided user-actuated navigation control panel;

receiving audio information; and storing the audio information in location within the memory associated with the selected category of the hierarchical memory structure.

15. The method of claim 14, wherein the receiving step includes the step of receiving the audio information from an information source external to the audio database device.

16. The method of claim 14, including the further step of converting the received audio information to corresponding text information, and the storing step includes the step of storing the audio information as the corresponding text information in the selected category.

17. The method of claim 14, including the further steps of:

receiving text information; and storing the text information in the selected category.

18. The method of claim 14, including the further steps of:

converting the stored audio information into corresponding text information; and transmitting the text information to a device external to the audio database device.

19. The method of claim 14, including the further steps of:

converting the stored audio information into corresponding text information; and displaying the text information.

20. The method of claim 14, including the further steps of:

marking a portion of the audio information; and storing the marked portion of the audio information in the selected category or in a category other than the selected category.

21. The method of claim 14, including the further steps of:

linking a first icon with a first category; and selectively linking the first icon with a category other than the first category.

* * * * *